(12) United States Patent
Golitschek Edler von Elbwart

(10) Patent No.: US 12,224,853 B2
(45) Date of Patent: *Feb. 11, 2025

(54) CODEWORD DISABLING IN MULTI-SUBFRAME GRANTS

(71) Applicant: Panasonic Intellectual Property Corporation of America, Torrance, CA (US)

(72) Inventor: Alexander Golitschek Edler von Elbwart, Hessen (DE)

(73) Assignee: Panasonic Intellectual Property Corporation of America, Torrance, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/531,495

(22) Filed: Dec. 6, 2023

(65) Prior Publication Data

US 2024/0113802 A1    Apr. 4, 2024

Related U.S. Application Data

(63) Continuation of application No. 18/172,236, filed on Feb. 21, 2023, now Pat. No. 11,894,922, which is a
(Continued)

(30) Foreign Application Priority Data

Aug. 11, 2016    (EP) .................. 16183876

(51) Int. Cl.
*H04L 1/00* (2006.01)
*H04L 1/16* (2023.01)
(Continued)

(52) U.S. Cl.
CPC .......... *H04L 1/0004* (2013.01); *H04L 1/0001* (2013.01); *H04L 1/1614* (2013.01);
(Continued)

(58) Field of Classification Search
CPC ... H04L 1/0001; H04L 1/0004; H04L 1/1614; H04L 1/1812; H04L 5/001; H04L 1/0003;
(Continued)

(56) References Cited

U.S. PATENT DOCUMENTS

2011/0149774 A1* 6/2011 Chen ............... H04L 1/1887
370/252
2011/0205988 A1* 8/2011 Zhang .............. H04B 7/0413
370/329
(Continued)

FOREIGN PATENT DOCUMENTS

CN    102484520 A    5/2012
CN    102771061 A    11/2012
(Continued)

OTHER PUBLICATIONS

Ericsson et al., "RAN1 Agreements, Working Assumptions and Conclusions for Rel-14 Enhanced LAA," R1-16xxxx, Agenda Item: 6.2.1, 3GPP TSG RAN WGl Meeting #85, Nanjing, China, May 23-27, 2015, 14 pages.
(Continued)

*Primary Examiner* — Awet Haile
(74) *Attorney, Agent, or Firm* — Seed IP Law Group LLP

(57) ABSTRACT

The present disclosure relates to enabling and disabling of codewords in multi-subframe grants. In particular, dynamic and subframe based enabling/disabling of codewords is enabled even if other control parameters including the resource allocation is performed for multiple subframes. For instance, signal from a scheduling entity to a scheduled entity comprises control information including the resource grant common for multiple subframes and a plurality of codewords for each subframe, and a codeword indication indicating enabling or disabling of one or more codewords for each of the multiple subframes. For each subframe it is determined whether a codeword from the plurality of code-
(Continued)

words in said subframes is enabled or disabled according to the codeword indication and/or which codeword is enabled or disabled. The indication of enabling and disabling may alternatively be done by using modulation and coding scheme indicator values which are not associated with a particular modulation and coding scheme.

7 Claims, 10 Drawing Sheets

Related U.S. Application Data continuation of application No. 17/124,952, filed on Dec. 17, 2020, now Pat. No. 11,616,593, which is a continuation of application No. 16/324,079, filed as application No. PCT/EP2017/064314 on Jun. 12, 2017, now Pat. No. 10,911,174.

(51) Int. Cl.
| | | |
|---|---|---|
| *H04L 1/1607* | (2023.01) | |
| *H04L 1/18* | (2023.01) | |
| *H04L 1/1812* | (2023.01) | |
| *H04W 72/04* | (2023.01) | |
| *H04W 72/0446* | (2023.01) | |
| *H04W 72/0453* | (2023.01) | |
| *H04W 72/14* | (2009.01) | |
| *H04W 72/23* | (2023.01) | |
| *H04L 5/00* | (2006.01) | |

(52) U.S. Cl.
CPC ....... *H04L 1/1812* (2013.01); *H04W 72/0446* (2013.01); *H04W 72/0453* (2013.01); *H04W 72/23* (2023.01); *H04L 5/001* (2013.01)

(58) Field of Classification Search
CPC ... H04L 1/0009; H04L 1/0027; H04L 1/0029; H04W 72/042; H04W 72/0446; H04W 72/0453; H04W 72/14; H04B 7/0413
See application file for complete search history.

(56) References Cited

U.S. PATENT DOCUMENTS

| | | | |
|---|---|---|---|
| 2011/0243079 A1 | 10/2011 | Chen et al. | |
| 2012/0327884 A1* | 12/2012 | Seo ...................... | H04L 5/0094 370/329 |
| 2013/0021898 A1 | 1/2013 | Kang et al. | |
| 2014/0219213 A1 | 8/2014 | Ko et al. | |
| 2015/0245323 A1 | 8/2015 | You et al. | |
| 2015/0319776 A1* | 11/2015 | Seo ...................... | H04L 1/1822 370/329 |
| 2016/0020929 A1* | 1/2016 | Yamazaki ............... | H04L 27/18 375/300 |
| 2016/0073391 A1* | 3/2016 | Awad .................... | H04L 1/1864 370/329 |
| 2019/0044639 A1* | 2/2019 | Ouchi ................... | H04W 72/23 |
| 2019/0059057 A1 | 2/2019 | Peng et al. | |
| 2019/0349171 A1* | 11/2019 | Lee ....................... | H04W 24/10 |

FOREIGN PATENT DOCUMENTS

| | | |
|---|---|---|
| CN | 102859915 A | 1/2013 |
| CN | 105210320 A | 12/2015 |
| EP | 1944896 A1 | 7/2008 |
| EP | 2995029 A0 | 3/2016 |
| JP | 2013520914 A | 6/2013 |
| JP | 2013526110 A | 6/2013 |
| KR | 10-2012-0010099 A | 2/2012 |
| RU | 2 463 712 C1 | 10/2012 |
| RU | 2 553 076 C2 | 6/2015 |
| WO | WO 2008083804 A2 | 7/2008 |
| WO | WO 2009048278 A2 | 4/2009 |
| WO | 2014181847 A1 | 11/2014 |

OTHER PUBLICATIONS

Intel Corporation, "Signaling for Flexible Timing UL Scheduling," R1-162352, Agenda Item: 7.3.1.1, 3GPP TSF RAN WG1 Meeting #84bis, Busan, Korea, Apr. 11-15, 2016, 4 pages.
LG Electronics et al., "Second WF on Multi-subframe scheduling in LAA," R1-165822, Agenda Item: 6.2.1.1, 3GPP TSG RAN WGI meeting #85, Nanjing, China, May 23-27, 2016, 3 pages.
Yerramalli, Srinivas, [email discussion] "RE: [84b-04] eLAA multi-subframe scheduling—proposals," May 6, 2016, 2 pages.
3GPP TR 36.889 V13.0.0, "3rd Generation Partnership Project; Technical Specification Group Radio Access Network; Study on Licensed-Assisted Access to Unlicensed Spectrum; (Release 13)," Jun. 2015, 285 pages.
3GPP TS 36.211 V13.2.0, "3rd Generation Partnership Project; Technical Specification Group Radio Access Network; Evolved Universal Terrestrial Radio Access (E-UTRA); Physical channels and modulation (Release 13)," Jun. 2016, 168 pages.
3GPP TS 36.211 V8.9.0, "3rd Generation Partnership Project; Technical Specification Group Radio Access Network; Evolved Universal Terrestrial Radio Access (E-UTRA); Physical channels and modulation (Release 8)," Dec. 2009, 83 pages.
3GPP TS 36.212 V13.2.0, "3rd Generation Partnership Project; Technical Specification Group Radio Access Network; Evolved Universal Terrestrial Radio Access (E-UTRA); Multiplexing and channel coding (Release 13)," Jun. 2016, 140 pages.
3GPP TS 36.213 V13.2.0, "3rd Generation Partnership Project; Technical Specification Group Radio Access Network; Evolved Universal Terrestrial Radio Access (E-UTRA); Physical layer procedures (Release 13)," Jun. 2016, 381 pages.
China Telecom, "Discussion on multi-subframe scheduling," R1-132202, Agenda Item: 6.2.5.1.1, 3GPP TSG RAN WG1 Meeting #73, Fukuoka, Japan, May 20-24, 2013. (5 pages).
Chinese Office Action, dated Dec. 2, 2020, for Chinese Application No. 2017800488252, 32 pages. (with English machine translation).
Chinese Office Action, dated Jul. 8, 2021, for Chinese Application No. 201780048825.2, 12 pages. (with English Translation).
Chinese Office Action, issued Sep. 29, 2023, for Chinese Patent Application No. 202210078210.7. (12 pages) (with English translation).
English Translation of Japanese Office Action, issued Nov. 15, 2022, for Japanese Patent Application No. 2021-202705. (7 pages).
English translation of Korean Office Action, mailed Jul. 15, 2021, for Korean Application No. 2019-7003944, 1 page.
Ericsson et al., "RAN1 Agreements, Working Assumptions and Conclusions for Rel-14 Enhanced LAA," R1-166049, Agenda Item: 6.2.1, 3GPP TSF RAN WG1 Meeting #85, Nanjing, China, May 23-27, 2015. (14 pages).
ETSI EN 301 893 V2.1.1, "5 GHz RLAN; Harmonised Standard covering the essential requirements of article 3.2 of Directive 2014/53/EU," May 2017, 122 pages.
European Office Action, mailed Jul. 27, 2021, for European Application No. 17 728 239.9-1216, 9 pages.
Extended European Search Report, dated Feb. 10, 2017, for the related European Application No. 16183876.8-1874, 16 pages.
Indian Examination Report, mailed Jun. 14, 2021, for Indian Application No. 201947004844, 5 pages.
International Search Report, dated Aug. 7, 2017, for the related International Application No. PCT/EP2017/064314, 3 pages.
Japanese Notice of Reasons for Rejections, dispatched Aug. 3, 2021, for Japanese Application No. 2019-503440, 16 pages.
Koorapaty, "Status Report to TSG," RP-161250, Agenda item: 10.2.1, 3GPP TSG RAN meeting #72, Busan, Korea, Jun. 13-16, 2016. (16 pages).
LG Electronics, "Multi-subframe scheduling in LAA," R1-164496, Agenda Item: 6.2.1.1, 3GPP TSG RAN WG1 meeting #85, Nanjing, China, May 23-27, 2016. (12 pages).

(56) References Cited

OTHER PUBLICATIONS

LG Electronics, "Summary of email discussion on multi-subframe scheduling," R1-164497, Agenda Item: 6.2.1.1, 3GPP TSG RAN WG1 meeting #85, Nanjing, China, May 23-27, 2016, 26 pages.

Nokia et al., "eLAA US scheduling / UL grant details," R1-164941, Agenda item: 6.2.1.1, 3GPP TSG RAN WG1 Meeting #85, Nanjing, China, May 23-27, 2016. (9 pages).

Nokia, Alcatel-Lucent Shanghai Bell, "On LAA UL scheduling and UL grant enhancements," R1-162784, Agenda item: 7.3.1.1, 3GPP TSG RAN WG1 Meeting #84bis, Busan, Korea, Apr. 11-15, 2016, 9 pages.

Philips, "Corrections to Transmitted Rank Indication," R1-090044, 3GPP TSG-RAN WG1 Meeting #55bis, Ljubljana, Slovenia, Jan. 12-16, 2009. (9 pages).

Qualcomm Incorporated, "DCI design for PUSCH scheduling in eLAA," R1-164410, Agenda Item: 6.2.1.1, 3GPP TSG RAN WG1 #85, Nanjing, China, May 23-27, 2016, 4 pages.

Russian Office Action dated May 21, 2020 for the corresponding Russian Patent Application No. 2019103586/07(006668), 8 pages. (With English Translation).

Russian Search Report dated May 21, 2020, for the corresponding Russian Patent Application No. 2019103586/07(006668), 4 pages. (With English Translation).

Samsung, "Discussion on multi-subframe scheduling for UL LAA," R1-160557, 3GPP TSG RAN WG1 Meeting #84, Agenda item: 7.3.1.1, St. Julian's, Malta, Feb. 15-19, 2016, 2 pages.

Chinese Notification of the Decision to Grant a Patent Right for Patent for Invention, dated May 22, 2024, for Chinese Patent Application No. 202210078210.7 (7 pages) (with partial English translation).

\* cited by examiner

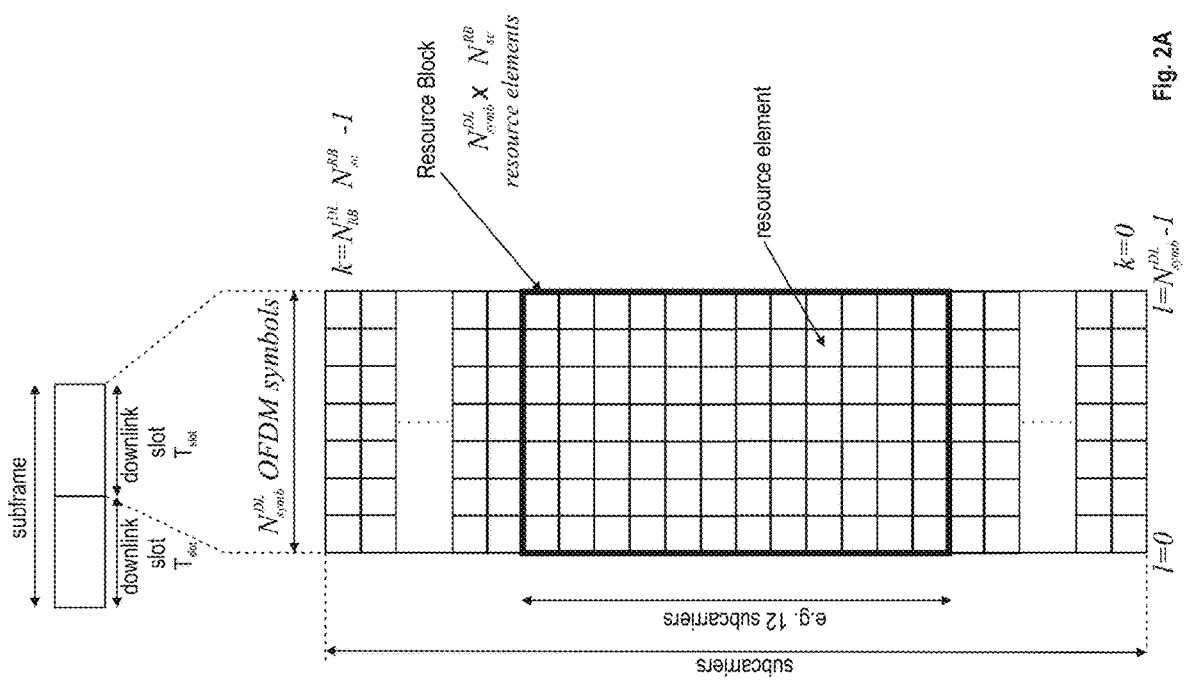

| MCS Index $I_{MCS}$ | Modulation Order $Q_m$ | TBS Index $I_{TBS}$ | Redundancy Version $rv_{idx}$ |
|---|---|---|---|
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |
| 10 | 4 | 10 | 0 |
| 11 | 4 | 10 | 0 |
| 12 | 4 | 11 | 0 |
| 13 | 4 | 12 | 0 |
| 14 | 4 | 13 | 0 |
| 15 | 4 | 14 | 0 |
| 16 | 4 | 15 | 0 |
| 17 | 4 | 16 | 0 |
| 18 | 4 | 17 | 0 |
| 19 | 4 | 18 | 0 |
| 20 | 6 | 19 | 0 |
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |
| 26 | 6 | 24 | 0 |
| 27 | 6 | 25 | 0 |
| 28 | 6 | 26 | 0 |
| 29 | reserved | | 1 |
| 30 | reserved | | 2 |
| 31 | reserved | | 3 |

| Field | DCI Format 0B | DCI Format 4B |
|---|---|---|
| Number of scheduled subframes | Common (1 or 2 bits) | Common (1 or 2 bits) |
| Carrier Indicator Field | Common | Common |
| Resource Assignment | Common | Common |
| Cyclic shift (DMRS) and OCC | Common | Common |
| New Data Indicator | 1 bit per subframe | 1 bit per subframe |
| MCS | Common | One field per codeword |
| UL TPC | Common | Common |
| SRS Trigger | Common (2 bits) | Common (2 bits) |
| Ending SC-FDMA Symbol | Applicable to the last subframe | Applicable to the last subframe |
| HARQ process ID | For the first subframe | For the first subframe |
| Redundancy Version | Per subframe (1 bit) | Per subframe (1 bit) |
| Schedule Timing Offset | Common (4 bits) | Common (4 bits) |
| CSI Trigger | Applicable to one subframe | Applicable to one subframe |

Fig. 7A

| One codeword: Codeword 0 enabled Codeword 1 disabled | | Two codewords: Codeword 0 enabled Codeword 1 enabled | |
|---|---|---|---|
| Bit field mapped to index | Message | Bit field mapped to index | Message |
| 0 | 1 layer: TPMI=0 | 0 | 2 layers: TPMI=0 |
| 1 | 1 layer: TPMI=1 | 1-7 | reserved |
| 2 | 1 layer: TPMI=2 | | |
| ... | ... | | |
| 5 | 1 layer: TPMI=5 | | |
| 6-7 | reserved | | |

Fig. 7B

| One codeword: Codeword 0 enabled Codeword 1 disabled | | Two codewords: Codeword 0 enabled Codeword 1 enabled | |
|---|---|---|---|
| Bit field mapped to index | Message | Bit field mapped to index | Message |
| 0 | 1 layer: TPMI=0 | 0 | 2 layers: TPMI=0 |
| 1 | 1 layer: TPMI=1 | 1 | 2 layers: TPMI=1 |
| ... | ... | ... | ... |
| 23 | 1 layer: TPMI=23 | 15 | 2 layers: TPMI=15 |
| 24 | 2 layers: TPMI=0 | 16 | 3 layers: TPMI=0 |
| 25 | 2 layers: TPMI=1 | 17 | 3 layers: TPMI=1 |
| ... | ... | ... | ... |
| 39 | 2 layers: TPMI=15 | 27 | 3 layers: TPMI=11 |
| 40-63 | reserved | 28 | 4 layers: TPMI=0 |
| | | 29 - 63 | Reserved |

CODEWORD DISABLING IN MULTI-SUBFRAME GRANTS

BACKGROUND

Technical Field

The present invention relates to signaling of scheduling information in a communication system with multiple subframes, in particular to apparatuses, methods and signal implementing such signaling.

Description of the Related Art

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade. The ability to provide high bit rates is a key measure for LTE.

The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM)-based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA)-based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

LTE Architecture

The overall LTE architecture is shown in FIG. 1. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The Radio Resource Control (RRC) layer controls communication between a UE and an eNB at the radio interface and the mobility of a UE moving across several cells. The RRC protocol also supports the transfer of NAS information. For UEs in RRC_IDLE, RRC supports notification from the network of incoming calls. RRC connection control covers all procedures related to the establishment, modification and release of an RRC connection, including paging, measurement configuration and reporting, radio resource configuration, initial security activation, and establishment of Signalling Radio Bearer (SRBs) and of radio bearers carrying user data (Data Radio Bearers, DRBs). The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle-state user equipments, the SGW terminates the downlink data path and triggers paging when downlink data arrives for the user equipment. It manages and stores user equipment contexts, e.g., parameters of the IP bearer service, or network internal routing information. It also performs replication of the user traffic in case of lawful interception.

The MME is the key control-node for the LTE access-network. It is responsible for idle-mode user equipment tracking and paging procedure including retransmissions. It is involved in the bearer activation/deactivation process and is also responsible for choosing the SGW for a user equipment at the initial attach and at the time of intra-LTE handover involving Core Network (CN) node relocation. It is responsible for authenticating the user (by interacting with the HSS). The Non-Access Stratum (NAS) signaling terminates at the MME, and it is also responsible for the generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Component Carrier Structure in LTE

The downlink component carrier of a 3GPP LTE system is subdivided in the time-frequency domain in so-called subframes. In 3GPP LTE each subframe is divided into two downlink slots as shown in FIG. 2A, wherein the first downlink slot comprises the control channel region (PDCCH region) within the first OFDM symbols. Each subframe consists of a give number of OFDM symbols in the time domain (12 or 14 OFDM symbols in 3GPP LTE (Release 8)), wherein each OFDM symbol spans over the entire bandwidth of the component carrier. The OFDM symbols thus each consist of a number of modulation symbols transmitted on respective subcarriers. In LTE, the transmitted signal in each slot is described by a resource grid of $N_{RB}^{DL} N_{sc}^{RB}$ subcarriers and $N_{symb}^{DL}$ OFDM symbols. $N_{RB}^{DL}$ is the number of resource blocks within the bandwidth. The quantity $N_{RB}^{DL}$ depends on the downlink transmission bandwidth configured in the cell and shall fulfill $N_{RB}^{min,DL} \leq N_{RB}^{DL} \leq N_{RB}^{max,DL}$, where $N_{RB}^{min,DL}=6$ and $N_{RB}^{max,DL}=110$ are respectively the smallest and the largest downlink bandwidths, supported by the current version of the specification. $N_{sc}^{RB}$ is the number of subcarriers within one resource block. For normal cyclic prefix subframe structure, $N_{sc}^{RB}=12$ and $N_{symb}^{DL}=7$. For the uplink, a grid shown in FIG. 2B is provided; reference is also made in this respect to FIGS. 6.2.2-1 and 5.2.1-1 in 3GPP TS 36.211, v. 13.2.0.

Assuming a multi-carrier communication system, e.g., employing OFDM, as for example used in 3GPP Long Term Evolution (LTE), the smallest unit of resources that can be assigned by the scheduler is one "resource block". A physical resource block (PRB) is defined as consecutive OFDM symbols in the time domain (e.g., 7 OFDM symbols) and consecutive subcarriers in the frequency domain as exemplified in FIG. 2 (e.g., 12 subcarriers for a component carrier). In 3GPP LTE (Release 8), a physical resource block thus consists of resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", section 6.2, (for instance version v8.9.0, available at http://www.3gpp.org and incorporated herein by reference).

One subframe consists of two slots, so that there are 14 OFDM symbols in a subframe when a so-called "normal" CP (cyclic prefix) is used, and 12 OFDM symbols in a subframe when a so-called "extended" CP is used. For sake of terminology, in the following the time-frequency resources equivalent to the same consecutive subcarriers spanning a full subframe is called a "resource block pair", or equivalent "RB pair" or "PRB pair".

The term "component carrier" refers to a combination of several resource blocks in the frequency domain. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Similar assumptions for the component carrier structure will apply to later releases too.

Carrier Aggregation in LTE-A for Support of Wider Bandwidth

The bandwidth that the LTE-Advanced system is able to support is 100 MHz, while an LTE system can only support 20 MHz. In carrier aggregation, two or more component carriers are aggregated in order to support wider transmission bandwidths up to 100 MHz. Several cells in the LTE system are aggregated into one wider channel in the LTE-Advanced system which is wide enough for 100 MHz even though these cells in LTE may be in different frequency bands. A user equipment may simultaneously receive or transmit on one or multiple component carriers (corresponding to multiple serving cells) depending on its capabilities. Carrier aggregation is supported for both contiguous and non-contiguous component carriers with each component carrier limited to a maximum of 110 Resource Blocks in the frequency domain (using the 3GPP LTE (Release 8/9) numerology).

When carrier aggregation is configured, the mobile terminal only has one RRC connection with the network. At RRC connection establishment/re-establishment, one cell provides the security input (one ECGI, one PCI and one ARFCN) and the non-access stratum mobility information (e.g., TAI) similarly as in LTE Rel. 8/9. After RRC connection establishment/re-establishment, the component carrier corresponding to that cell is referred to as the downlink Primary Cell (PCell). There is always one and only one downlink PCell (DL PCell) and one uplink PCell (UL PCell) configured per user equipment in connected state. Within the configured set of component carriers, other cells are referred to as Secondary Cells (SCells); with carriers of the SCell being the Downlink Secondary Component Carrier (DL SCC) and Uplink Secondary Component Carrier (UL SCC). Maximum five serving cells, including the PCell, can be configured for one UE.

Uplink Access Scheme for LTE

For uplink transmission, power-efficient user-terminal transmission is necessary to maximize coverage. Single-carrier transmission combined with FDMA with dynamic bandwidth allocation has been chosen as the evolved UTRA uplink transmission scheme. The main reason for the preference for single-carrier transmission is the lower peak-to-average power ratio (PAPR), compared to multi-carrier signals (OFDMA), and the corresponding improved power-amplifier efficiency and improved coverage (higher data rates for a given terminal peak power). During each time interval, eNode B assigns users a unique time/frequency resource for transmitting user data, thereby ensuring intra-cell orthogonality. An orthogonal access in the uplink promises increased spectral efficiency by eliminating intra-cell interference. Interference due to multipath propagation is handled at the base station (eNode B), aided by insertion of a cyclic prefix in the transmitted signal.

The basic physical resource used for data transmission consists of a frequency resource of size BWgrant during one time interval, e.g., a subframe, onto which coded information bits are mapped. It should be noted that a subframe, also referred to as transmission time interval (TTI), is the smallest time interval for user data transmission. It is however possible to assign a frequency resource BWgrant over a longer time period than one TTI to a user by concatenation of subframes.

Layer 1/Layer 2 Control Signaling

In order to inform the scheduled users about their allocation status, transport format and other transmission-related information (e.g., HARQ information, transmit power control (TPC) commands), L1/L2 control signaling is transmitted on the downlink along with the data. L1/L2 control signaling is multiplexed with the downlink data in a subframe, assuming that the user allocation can change from subframe to subframe. It should be noted that user allocation might also be performed on a TTI (Transmission Time Interval) basis, where the TTI length can be a multiple of the subframes. The TTI length may be fixed in a service area for all users, may be different for different users, or may even by dynamic for each user. Generally, the L1/2 control signaling needs only be transmitted once per TTI. Without loss of generality, the following assumes that a TTI is equivalent to one subframe.

The L1/L2 control signaling is transmitted on the Physical Downlink Control Channel (PDCCH). A PDCCH carries a message as a Downlink Control Information (DCI), which in most cases includes resource assignments and other control information for a mobile terminal or groups of UEs. In general, several PDCCHs can be transmitted in one subframe.

It should be noted that in 3GPP LTE, assignments for uplink data transmissions, also referred to as uplink scheduling grants or uplink resource assignments, are also transmitted on the PDCCH. Furthermore, Release 11 introduced an EPDCCH that fulfills basically the same function as the PDCCH, i.e., conveys L1/L2 control signaling, even though the detailed transmission methods are different from the PDCCH. Further details can be found particularly in the current versions of 3GPP TS 36.211 (e.g., version v13.2.0) and 3GPP TS 36.213, "Physical Layer Procedures", v13.2.0, available free of charge at www.3gpp.org and incorporated herein by reference. Consequently, most items outlined in the background and the embodiments apply to PDCCH as well as EPDCCH, or other means of conveying L1/L2 control signals, unless specifically noted.

Generally, the information sent in the L1/L2 control signaling for assigning uplink or downlink radio resources (particularly LTE(-A) Release 10) can be categorized to the following items:
  User identity, indicating the user that is allocated. This is typically included in the checksum by masking the CRC with the user identity;
  Resource allocation information, indicating the resources (e.g., Resource Blocks, RBs) on which a user is allocated. This information is also termed resource block assignment (RBA). Note, that the number of RBs on which a user is allocated can be dynamic;
  Carrier indicator, which is used if a control channel transmitted on a first carrier assigns resources that concern a second carrier, i.e., resources on a second carrier or resources related to a second carrier; (cross carrier scheduling);
  Modulation and coding scheme that determines the employed modulation scheme and coding rate;
  HARQ information, such as a new data indicator (NDI) and/or a redundancy version (RV) that is particularly useful in retransmissions of data packets or parts thereof;
  Power control commands to adjust the transmit power of the assigned uplink data or control information transmission;
  Reference signal information such as the applied cyclic shift and/or orthogonal cover code index, which are to be employed for transmission or reception of reference signals related to the assignment;
  Uplink or downlink assignment index that is used to identify an order of assignments, which is particularly useful in TDD systems;
  Hopping information, e.g., an indication whether and how to apply resource hopping in order to increase the frequency diversity;
  CSI request, which is used to trigger the transmission of channel state information in an assigned resource; and
  Multi-cluster information, which is a flag used to indicate and control whether the transmission occurs in a single cluster (contiguous set of RBs) or in multiple clusters (at least two non-contiguous sets of contiguous RBs). Multi-cluster allocation has been introduced by 3GPP LTE-(A) Release 10.

It is to be noted that the above listing is non-exhaustive, and not all mentioned information items need to be present in each PDCCH transmission depending on the DCI format that is used.

In the current LTE specification (Rel-13), the modulation and coding scheme (MCS) is determined by the parameters modulation order, transport block size (TBS) and number of resource elements (REs) that are used for the transport block transmission.

Supported modulation orders (number of bits per modulation symbol) for LTE in licensed bands comprise 2, 4, 6 and 8; corresponding to QPSK, 16QAM, 64QAM and 256QAM, respectively. Whether all of them will be supported for unlicensed band operation as well has not been discussed so far, but it is advantageous if the same set of modulation order will be supported for unlicensed band operation as well.

The TBS is determined by the TBS index by means of the MCS index that is indicated to the UE within the DCI and the number of PRBs that are allocated for the PDSCH transmission as described in Section 7.1.7 of 3GPP TS 36.213, v13.2.0, titled "Evolved Universal Terrestrial Radio Access (E-UTRA); Physical layer procedures", available at www.3gpp.org. The LTE specification TS 36.213 contains two-dimensional TBS tables in Section 7.1.7.2 of which the TBS index and number of scheduled PBRs indicates row and column, respectively. The table specifies the transport block sizes and thus, the coding and puncturing applicable.

FIG. 5 shows an uplink MCS table which assigns each of the 32 values 0-31 an MCS and/or a redundancy version. In particular, the first column represents an MCS index, which is included in the DCI. Each MCS index 0-28 is associated with a particular combination a of the modulation order (2=QPSK, 4=16QAM, 6=64QAM) and the Transport Block Size (TBS) Index as well as redundancy version index. The MCS indices (values) 29-31 are not associated with a particular modulation (order) or coding scheme (TBS index) in the uplink, but rather define the redundancy versions 1-3, while it is assumed that the modulation and coding scheme remains as it was in a preceding transmission (e.g., with redundancy version 0) of the same transport block.

A Redundancy Version (RV) specifies a starting point in a circular (re)transmission buffer to start reading operation. Usually RV=0 is selected for the initial transmission to send mainly systematic bits, since this approach has shown a good compromise between successful decoding at high Signal-to-Noise ratios (SNRs) and at low SNRs. The scheduler can choose different RVs on transmissions of the same packet to support both incremental redundancy and Chase combining. There are four redundancy versions currently defined, characterised by their starting positions, and numbered from 0 to 3. The usual sequence of these RVs for the first transmission and the subsequent retransmission is 0, 2, 3, 1.

Downlink control information occurs in several formats that differ in overall size and also in the information contained in their fields as mentioned above. The different DCI formats that are currently defined for LTE are as follows and described in detail in 3GPP TS 36.212, "Multiplexing and channel coding", section 5.3.3.1 (current version v13.2.0, available at http://www.3gpp.org and incorporated herein by reference). In addition, for further information regarding the DCI formats and the particular information that is transmitted in the DCI, please refer to the mentioned technical standard or to LTE—The UMTS Long Term Evolution—From Theory to Practice, Edited by Stefanie Sesia, Issam Toufik, Matthew Baker, Chapter 9.3, incorporated herein by reference.

Format 0: DCI Format 0 is used for the transmission of resource grants for the PUSCH, using single-antenna port transmissions in uplink transmission mode 1 or 2.

Format 1: DCI Format 1 is used for the transmission of resource assignments for single codeword PDSCH transmissions (downlink transmission modes 1, 2 and 7).

Format 1A: DCI Format 1A is used for compact signaling of resource assignments for single codeword PDSCH transmissions, and for allocating a dedicated preamble signature to a mobile terminal for contention-free random access (for all transmissions modes).

Format 1B: DCI Format 1B is used for compact signaling of resource assignments for PDSCH transmissions using closed loop precoding with rank-1 transmission (downlink transmission mode 6). The information transmitted is the same as in Format 1A, but with the addition of an indicator of the precoding vector applied for the PDSCH transmission.

Format 1C: DCI Format 1C is used for very compact transmission of PDSCH assignments. When format 1C is used, the PDSCH transmission is constrained to using QPSK modulation. This is used, for example, for signaling paging messages and broadcast system information messages.

Format 1D: DCI Format 1D is used for compact signaling of resource assignments for PDSCH transmission using multi-user MIMO. The information transmitted is the same as in Format 1B, but instead of one of the bits of the precoding vector indicators, there is a single bit to indicate whether a power offset is applied to the data symbols. This feature is needed to show whether or not the transmission power is shared between two UEs. Future versions of LTE may extend this to the case of power sharing between larger numbers of UEs.

Format 2: DCI Format 2 is used for the transmission of resource assignments for PDSCH for closed-loop MIMO operation (transmission mode 4).

Format 2A: DCI Format 2A is used for the transmission of resource assignments for PDSCH for open-loop MIMO operation. The information transmitted is the same as for Format 2, except that if the eNodeB has two transmit antenna ports, there is no precoding information, and for four antenna ports two bits are used to indicate the transmission rank (transmission mode 3).

Format 2B: Introduced in Release 9 and is used for the transmission of resource assignments for PDSCH for dual-layer beamforming (transmission mode 8).

Format 2C: Introduced in Release 10 and is used for the transmission of resource assignments for PDSCH for closed-loop single-user or multi-user MIMO operation with up to 8 layers (transmission mode 9).

Format 2D: introduced in Release 11 and used for up to 8 layer transmissions; mainly used for COMP (Cooperative Multipoint) (transmission mode 10)

Format 3 and 3A: DCI formats 3 and 3A are used for the transmission of power control commands for PUCCH and PUSCH with 2-bit or 1-bit power adjustments respectively. These DCI formats contain individual power control commands for a group of UEs.

Format 4: DCI format 4 is used for the scheduling of the PUSCH, using closed-loop spatial multiplexing transmissions in uplink transmission mode 2.

The PDCCH carries DCI on an aggregation of one or a plurality of consecutive control channel elements (CCEs). A control channel element corresponds to 9 resource element groups (REG) of which each consists of four or six resource elements.

A search space indicates a set of CCE locations where the UE may find its PDCCHs. Each PDCCH carries one DCI and is identified by the RNTI (radio network temporary identity) implicitly encoded in the CRC attachment of the DCI. The UE monitors the CCEs of a configured search space(s) by blind decoding and checking the CRC.

A search space may be a common search space and a UE-specific search space. A UE is required to monitor both common and UE-specific search spaces, which may be overlapping. The common search space carries the DCIs that are common for all UEs such as system information (using the SI-RNTI), paging (P-RNTI), PRACH responses (RA-RNTI), or UL TPC commands (TPC-PUCCH/PUSCH-RNTI). The UE-specific search space can carry DCIs for UE-specific allocations using the UE's assigned C-RNTI, semi-persistent scheduling (SPS C-RNTI), or initial allocation (temporary C-RNTI).

While traditional wireless communications (Single-Input Single-Output (SISO)) exploit time- or frequency-domain pre-processing and decoding of the transmitted and received data respectively, the use of additional antenna elements at either the base station (eNodeB) or User Equipment (UE) side (on the downlink or uplink) opens an extra spatial dimension to signal precoding and detection. Space-time processing methods exploit this dimension with the aim of improving the link's performance in terms of one or more possible metrics, such as the error rate, communication data rate, coverage area and spectral efficiency (expressed in bps/Hz/cell). Depending on the availability of multiple antennas at the transmitter and/or the receiver, such techniques are classified as Single-Input Multiple-Output (SIMO), Multiple-Input Single-Output (MISO) or MIMO. While a point-to-point multiple-antenna link between a base station and one UE is referred to as Single-User MIMO (SU-MIMO), Multi-User MIMO (MU-MIMO) features several UEs communicating simultaneously with a common base station using the same frequency- and time-domain resources.

The LTE standard defines what is known as antenna ports (cf. TS 36.211, v13.2.0, Section 5.2.1). The antenna ports do not correspond to physical antennas, but rather are logical entities distinguished by their reference signal sequences. Multiple antenna port signals can be transmitted on a single transmit antenna. Correspondingly, a single antenna port can be spread across multiple transmit antennas.

A spatial layer is the term used in LTE for one of the different streams generated by spatial multiplexing. A layer can be described as a mapping of symbols onto the transmit antenna ports. Each layer is identified by a precoding vector of size equal to the number of transmit antenna ports and can be associated with a radiation pattern. The rank of the transmission is the number of layers transmitted.

A codeword is an independently encoded data block, corresponding to a single Transport Block (TB) delivered from the Medium Access Control (MAC) layer in the transmitter to the physical layer, and protected with a CRC. For ranks greater than 1, two codewords can be transmitted. The number of codewords is always less than or equal to the number of layers, which in turn is always less than or equal to the number of antenna ports. It is possible to map Transport Block 1 to Codeword 0 and Transport Block 2 to Codeword 1, or alternatively to map Transport Block 2 to Codeword 0 and Transport Block 1 to Codeword 1.

In order to enable fast rank and precoder adaptation for a downlink transmission mode, it is possible to configure the UE to feed back a Rank Indicator (RI) together with a Precoding Matrix Indicator (PMI) which indicate the preferred RI/PMI based on the measured quality. On the other hand, the eNB indicates via a Transmitted Precoding Matrix Indicator (TPMI) in the downlink assignment message on the PDCCH whether it is applying the UE's preferred precoder, and if not, which precoder is used. This enables the UE to derive the correct phase reference relative to the cell-specific RSs in order to demodulate the PDSCH data.

Similarly, the eNB is able to control the rank and precoder for an uplink transmission mode. In contrast to downlink, there is no explicit feedback by the UE such as RI and PMI. The eNB rather can take the transmitted reference symbols from an uplink transmission (such as the demodulation reference symbols or sounding reference symbols) and use these to determine an appropriate number of transmitted layers and TPMI, which is then indicated in the uplink resource assignment message (DCI) transmitted on a control channel such as the PDCCH.

LTE on Unlicensed Bands—Licensed-Assisted Access LAA

A work item addressing the specification of LTE for unlicensed band operation was initiated in June 2015. The reason for extending LTE to unlicensed bands is the ever-growing demand for wireless broadband data in conjunction with the limited amount of licensed bands. Unlicensed spectrum therefore is more and more considered by cellular operators as a complementary tool augment their service offering. The advantage of LTE in unlicensed bands compared to relying on other radio access technologies (RAT) such as Wi-Fi is that complementing the LTE platform with unlicensed spectrum access enables operators and vendors to leverage the existing or planned investments in LTE/EPC hardware in the radio and core network.

However, it has to be taken into account that unlicensed spectrum access can never match the qualities of licensed spectrum due to the inevitable coexistence with other radio access technologies (RATs) in the unlicensed spectrum. LTE operation in unlicensed bands will therefore at least in the beginning be considered rather a complement to LTE on licensed spectrum than stand-alone operation in unlicensed spectrum. Based on this assumption, 3GPP established the term Licensed Assisted Access (LAA) for the LTE operation in unlicensed bands in conjunction with at least one licensed band. Future stand-alone operation of LTE in unlicensed spectrum without relying on LAA is however not excluded.

The current general LAA approach at 3GPP is to make use of the already specified Rel-12 carrier aggregation (CA) framework as much as possible where the CA framework configuration comprises a so-called primary cell (PCell) carrier and one or more secondary cell (SCell) carriers. CA supports in general both self-scheduling of cells (scheduling information and user data are transmitted on the same carrier) and cross-carrier scheduling between cells (scheduling information in terms of PDCCH/EPDCCH and user data in terms of PDSCH/PUSCH are transmitted on different carriers).

The basic envisioned approach at 3GPP is that the PCell will be operated on a licensed band while one or more SCells will be operated in unlicensed bands. The benefit of this strategy is that the PCell can be used for reliable transmission of control messages and user data with high quality of service (QoS) demands, such as for example voice and video, while a PCell in unlicensed spectrum might yield, depending on the scenario, to some extent significant QoS reduction due to inevitable coexistence with other RATs. A very basic scenario is illustrated in FIG. 3, with a licensed PCell, licensed SCell 1, and various unlicensed SCells 2, 3, and 4 (exemplarily depicted as small cells). The transmission/reception network nodes of unlicensed SCells 2, 3, and 4 could be remote radio heads managed by the eNB or could be nodes that are attached to the network but not managed by the eNB. For simplicity, the connection of these nodes to the eNB or to the network is not explicitly shown in the figure.

It has been agreed at 3GPP, that the LAA investigation and specification will focus in the first step on unlicensed bands at 5 GHz. One of the most critical issues is therefore the coexistence with Wi-Fi (IEEE 802.11) systems operating in these unlicensed bands. In order to support fair coexistence between LTE and other technologies such as Wi-Fi as well as fairness between different LTE operators in the same unlicensed band, the channel access procedures of LTE for unlicensed band operation has to abide by certain sets of regulatory rules which depend on region (Europe, US, China, Japan, etc.) and considered frequency band. A comprehensive description of the regulatory requirements for operation in unlicensed bands at 5 GHz is given in 3GPP TR 36.889, v13.0.0 of June 2015, titled "Study on Licensed-Assisted Access to Unlicensed Spectrum", available at www.3gpp.org. Depending on region and band, regulatory requirements that have to be taken into account when designing LAA procedures comprise Dynamic Frequency Selection (DFS), Transmit Power Control (TPC), Listen Before Talk (LBT) and discontinuous transmission with limited maximum transmission duration. The intention of 3GPP is to target a single global framework for LAA which basically means that all requirements for different regions and bands at 5 GHz have to be taken into account for the system design.

The DFS operation and corresponding requirements are associated with a master-slave principle. The master shall detect radar interference, can however rely on another device, that is associated with the master, to implement the radar detection. Following the European regulation regarding LBT, devices have to perform a Clear Channel Assessment (CCA) before occupying the radio channel. It is only allowed to initiate a transmission on the unlicensed channel after detecting the channel as free based on energy detection. The equipment has to observe the channel for a certain minimum during the CCA. The channel is considered occupied if the detected energy level exceeds a configured CCA threshold. If the channel is classified as free, the equipment is allowed to transmit immediately. The maximum transmit duration is thereby restricted in order to facilitate fair resource sharing with other devices operating on the same band.

The energy detection for the CCA is performed over the whole channel bandwidth (e.g., 20 MHz in unlicensed bands at 5 GHz), which means that the reception power levels of all subcarriers of an LTE OFDM symbol within that channel contribute to the evaluated energy level at the device that performed the CCA.

Furthermore, the total time during which an equipment occupies a given unlicensed channel by means of continuous transmission without re-evaluating the availability of that channel (i.e., LBT/CCA) is defined as the Channel Occupancy Time (see ETSI 301 893, under clause 4.8.3.1). The Channel Occupancy Time shall be in the range of 1 ms to 10 ms, where the maximum Channel Occupancy Time could be, e.g., 4 ms as currently defined for Japan. There is furthermore a minimum Idle time during which the equipment is not allowed to occupy the unlicensed channel again after a transmission on that unlicensed channel, the minimum Idle time being at least 5% of the preceding Channel Occupancy Time. At the end of the Idle Period, the UE can perform a new CCA, and so on. This transmission behavior is schematically illustrated in FIG. 4.

Multiple Subframe Allocation

There has been a discussion in 3GPP RAN1 concerning the possibility of multi-subframe scheduling for the uplink LAA (cf. 3GPP RAN1 contribution R1-160557 titled "Discussion on multi-subframe scheduling for UL LAA", Meeting #84 in Malta, February 2016). Accordingly, with the exception of semi-persistent scheduling (SPS) and UL grants in TDD UL/DL configuration 0, only per-TTI scheduling is allowed. Downlink or uplink grant received in subframe n schedules only one PDSCH or PUSCH for a subframe n+k, where k=0 and 4 for downlink and uplink respectively, in FDD case.

Based on FDD HARQ timing, upon reception of the UL grant in subframe n, the scheduled LAA UE(s) would require to perform LBT on the scheduled unlicensed carrier to occupy the channel before the start of PUSCH transmission in the subframe n+4. The eNB cannot predict LBT result at UE side when the UL grant is sent in subframe n, the eNB has no choice but to send the UL grant with the expectation that UEs would occupy the channel for the scheduled PUSCH in subframe n+4. However, if UE cannot complete the required LBT for uplink transmission on time, the scheduled PUSCH cannot be transmitted in the scheduled subframe, which results in not only the waste resources for UL grants but also the waste UL resource for PUSCH transmission. LAA UL transmission should be designed to increase channel access opportunity of LAA with less scheduling overhead.

To increase channel access opportunity while minimizing signaling overhead to schedule PUSCH on unlicensed carrier, multi-subframe scheduling are being considered. A multi-subframe scheduling allows UE to transmit PUSCH in one or multiple subframes in the scheduled subframes whenever UEs pass the LBT by one UL grant. In case of demands on DL is low but that for UL is high, it would be beneficial to support multi-subframe scheduling to avoid unnecessary DL transmission to send UL grant. In this case, it would not only save the signaling overhead for sending UL grant but also reduce the overall interference to other nodes.

BRIEF SUMMARY

One non-limiting and exemplary embodiment provides apparatuses and methods for using multiple subframe allocation while still providing efficient control information granularity.

In one general aspect, the techniques disclosed here feature an apparatus for receiving a resource grant for multiple subframes in a communication system, the apparatus comprising a transceiver for receiving signal comprising a control information including the resource grant for multiple subframes and a plurality of codewords for each subframe, a precoding indication common for the multiple subframes, a modulation and coding scheme, MCS, indicator common for the granted multiple subframes and individual for each of the plurality of codewords, the MCS indicator taking one of a plurality of values including values indicating one of a plurality of MCSs and at least one value not indicating MCS; and a processing device configured to determine that a codeword from the plurality of codewords in the multiple subframes is disabled if the MCS indicator for at least one of the plurality of codewords has a value not indicating MCS and not disabled otherwise.

In another general aspect, the techniques disclosed here feature an apparatus for receiving a resource grant for multiple subframes in a communication system, the apparatus comprising a transceiver for receiving signal comprising a control information including the resource grant common for multiple subframes and a plurality of codewords for each subframe, a codeword indication indicating enabling or disabling of one or more codewords for each of the multiple subframes, a processing device configured to determine for each subframe whether a codeword from the plurality of codewords in said subframes is enabled or disabled according to the codeword indication and/or which codeword is enabled or disabled.

It should be noted that general or specific embodiments may be implemented as a signal, a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

In the following exemplary embodiments are described in more detail with reference to the attached figures and drawings.

FIGS. 2A and 2B show an exemplary downlink resource grid of a downlink slot of a subframe as defined for 3GPP LTE (Release 8/9), FIG. 5 is an MCS table showing MCS index associated with a modulation order and transport block index, as well as a redundancy version, FIG. 6 is a table capturing current design of a multiple subframe allocation signaling, FIGS. 7A and 7B are tables illustrating MIMO relevant information signaling for two and four antenna ports, respectively.

DETAILED DESCRIPTION

Figure 1:
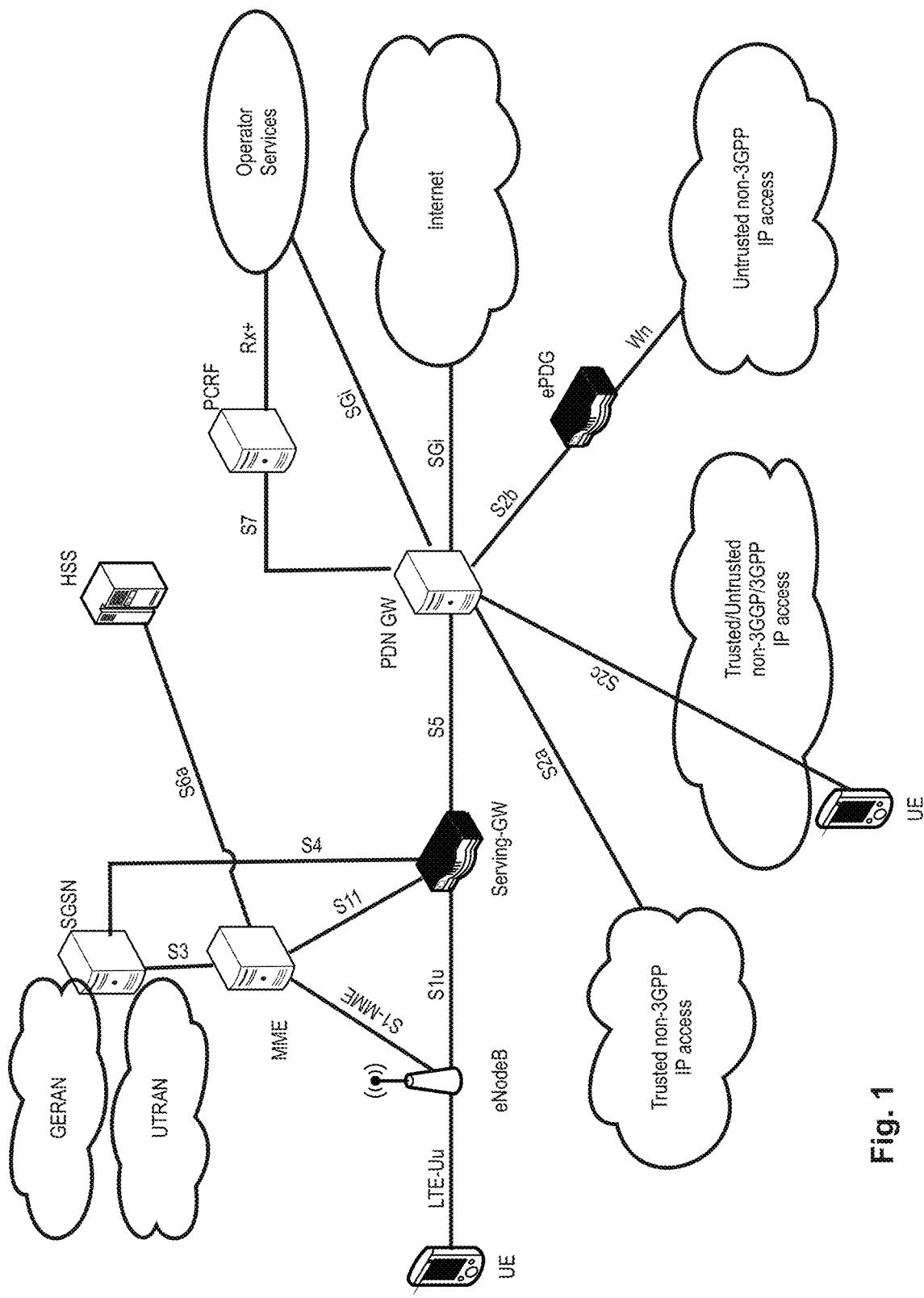
FIG. 1 shows an exemplary architecture of a 3GPP LTE system.
Figure 2B:
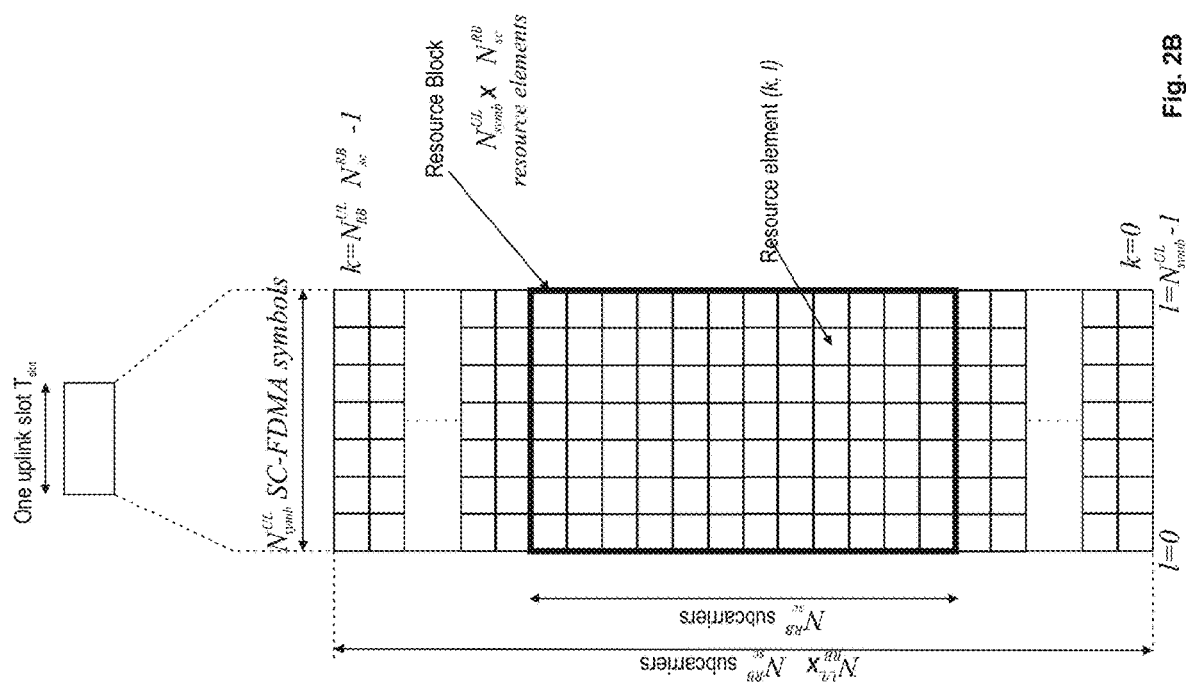
Figure 3:
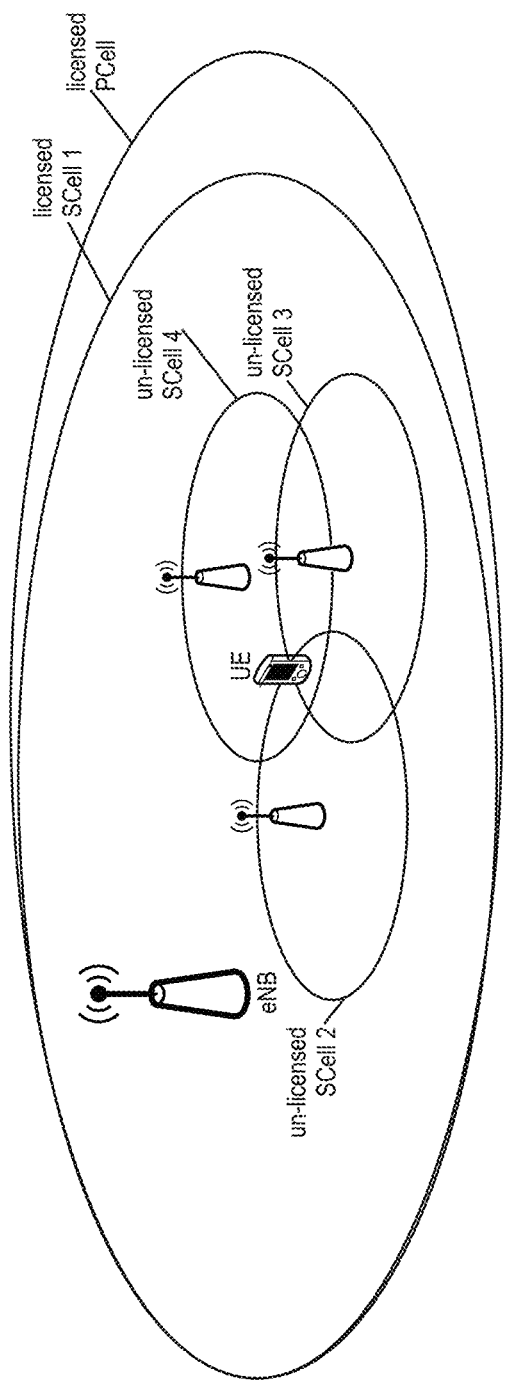
FIG. 3 illustrates an exemplary licensed-assisted access scenario, with various licensed and unlicensed cells.
Figure 4:
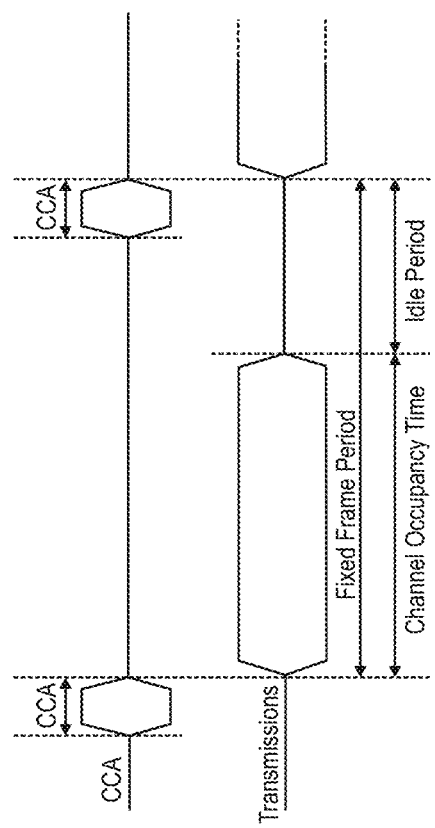
FIG. 4 illustrates schematically the transmission timing on an unlicensed band, including the different periods, Channel Occupancy Time, Idle Period, and Fixed Frame Period.

A mobile station or mobile node or user terminal or user equipment is a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The term "radio resources" as used in the set of claims and in the application is to be broadly understood as referring to physical radio resources, such as time-frequency resources.

The term "unlicensed cell" or alternatively "unlicensed carrier" as used in the set of claims and in the application is to be understood broadly as a cell/carrier in an unlicensed frequency band. Correspondingly, the term "licensed cell" or alternatively "licensed carrier" as used in the set of claims and in the application is to be understood broadly as a cell/carrier in a licensed frequency band. Exemplarily, these terms are to be understood in the context of 3GPP as of Release 12/13 and the Licensed-Assisted Access Work Item.

A transport block (TB) that will be transmitted in a physical downlink shared channel (PDSCH) or physical uplink shared channel (PUSCH) has to be prepared prior to the transmission of the PDSCH or PUSCH itself. A certain number of bits, given by the transport block size (TBS), are taken from a specific HARQ process queue of the MAC layer and passed down to the PHY (physical layer) together with a corresponding MAC header.

As mentioned above in the background section, there is a one-to-one mapping between a codeword and a transport block. Whether Transport Block 1 is mapped to Codeword 0 and Transport Block 2 to Codeword 1, or Transport Block 2 to Codeword 0 and Transport Block 1 to Codeword 1, is known either a priori through a static rule, a configuration, or a message included in a downlink control information. For simplicity, the description discusses enabling and disabling of codewords. However it should be understood that the description is equally applicable to a "Codeword" as well as to a "Transport Block". Therefore, the embodiments and examples should be understood to apply to enabled/disabled codewords as well as additionally or alternatively to enabled/disabled transport blocks.

FIG. 6 shows a table which summarizes some agreements currently discussed in 3GPP with respect to dedicated control information (DCI) used for uplink grants applicable to resources granted on an unlicensed carrier. In particular, the left column shows fields of the DCI. The middle and right columns show the respective DCI formats 0B and 4B together with which granularity the DCI fields may be defined for multi-subframe grants. DCI formats 0B and 4B are supposed to be pendants to the currently used DCI formats 0 and 4.

DCI format 4 is currently used for the scheduling of PUSCH in one UL cell with multi-antenna port transmission mode and includes inter alia for each of the two codewords (transport blocks) the MCS index (5 bits) defined as shown in FIG. 5 and NDI (1 bit). Moreover, a precoding information field of 3 or 6 bits is included to indicate TPMI and the number of layers.

In the table, the term "common" means that the respective field of the DCI applies for all subframes covered by the multi-subframe grants and for all codewords if a multilayer transmission is applied. For instance, resource assignment field defines resource blocks assigned per subframe and codeword. This resource block allocation then applies for each of the multiple subframes in each of the codewords of the subframes.

The DCI formats 0B and 4B, in general, correspond to the DCI formats 0 and 4 described above, but they provide a multi-subframe grant. This means that DCI format 0B is applicable to single antenna port transmissions whereas DCI format 4B is applicable to multi antenna port transmissions. As can be seen in the table of FIG. 6, DCI format 0B only accommodates one codeword and, since it does not support multi antenna transmission, it does not convey precoding information. On the other hand, DCI format 4B supports multi antenna port transmissions and thus may include features for the respective layers/codewords. Accordingly, the usage of some of the DCI fields by format 0B and 4B may differ. In FIG. 6 the modulation and coding scheme may advantageously be provided for each codeword in the presence of a plurality of codewords. However, it appears unnecessary to provide an MCS for each subframe since it is unlikely that the channel quality essentially changes that fast, and it is also not clear that the eNB could have sufficient knowledge about the changing channel conditions fast enough in order to use such knowledge when transmitting the DCI. Currently, it is unclear whether and how the precoding information is to be conveyed by the DCI format 4B.

As can be seen in FIG. 6, some of the fields are provided for each of the multiple subframes. For instance, a new data indicator is necessary for each subframe since each subframe may carry different data (since different TTTs are mapped onto the respective subframes) and thus each subframe may be individually retransmitted. Correspondingly, the redundancy version is also required on a per subframe basis. It is noted that the redundancy version in the legacy DCI with formats 0 and 4 is taken from a set of 4 defined values. In the table in FIG. 6, the redundancy version is a separate field, and has a one bit per subframe. In general, one bit should be sufficient to distinguish between two values of the redundancy version, as it is assumed that the number of retransmissions in the multi-subframe configuration will be kept low. Since one RV bit represents two possible states, it is currently envisaged that the first RV state represents RV0, while the second RV state represents RV2. It is noted that the table in FIG. 6 merely captures the current state of the discussion and may still change so it is a mere example of new DCI formats for the multi-subframe grants.

With the exception of the "Number of scheduled subframes" field, all fields shown in FIG. 6 would also be applicable for new DCI formats scheduling resources on an unlicensed carrier for a single subframe, tentatively called DCI format 0A and 4A, in general corresponding to DCI formats 0 and 4 respectively. As resources are assigned for a single subframe only, some fields that are described as "per subframe" in FIG. 6 would be applicable only for the indicated subframe.

Concerning multilayer transmission, previous releases of LTE provided various mechanisms for disabling a codeword. As described above, LTE uplink currently supports up to 4 layers. In the two (or more) layer transmission configuration, one codeword may be disabled dynamically by certain combinations of DCI fields which are supposed to be rarely used especially in combination with the two layer transmission. In particular, in release 8 it is possible to disable codeword for downlink (in uplink there is no MIMO in this release) by using DCI formats 2 and 2A (and additionally formats 2B, 2C and 2D that have been introduced in later LTE releases). A codeword is disabled if the MCS index is equal to zero ($I_{MCS}=0$) and if the redundancy version is equal to one ($rv_{idx}=1$). In this case, it is assumed that the modulation scheme QPSK as the most robust configurable modulation scheme provides sufficient quality so that not all of the possible redundancy versions are necessary in most cases. The redundancy version with value one is the last one in the sequence 0, 2, 3, 1 of redundancy versions applied.

In release 13 two further possibilities have been defined for disabling a codeword. A codeword is disabled for particular combinations of MCS index and number of physical resource blocks (PRBs) in DCI format 4. In particular, in DCI format 4, if the MCS index is equal to 0 ($I_{MCS}=0$) while the number of PRBs is greater than one ($N_{PRB}>1$), a codeword is disabled. Moreover, if MCS index is equal to 28 ($I_{MCS}=28$) and the number of PRBs is equal to 1 ($N_{PRB}=1$) the codeword is disabled. These combinations have been selected by considering that in uplink there is a power limitation. If the lowest MCS is used, it means that the channel conditions are not particularly good. With only one PRB, higher power may be applied so that successful transmission is possible. However, with a growing number of PRBs, the power is spread and the probability of correct reception is low. Thus, if multilayer transmission is applied, it is unlikely that the smallest MCS index will be used together with a higher number of PRBs. On the other hand, with a maximum MCS index defining an MCS, the channel quality is likely to be very high. Accordingly, it is unlikely that with such a high channel quality only a single PRB would be configured.

Codeword disabling is useful mainly if increased coverage or robust retransmissions are desired. In order to increase the overall coverage, a UE can employ beamforming for a single codeword transmission. Beamforming for a single codeword transmission may also improve the SINR and thus obtain a higher uplink throughput compared to non-beamformed single antenna port transmissions.

Moreover, if only a single codeword from an earlier multi codeword transmission needs to be retransmitted, it is advantageous to disable the second codeword in order to reduce inter-codeword interference.

However, with application of multi-subframe grants, these existing solutions may become unsuitable. In particular, using only the value of MCS which is equal to 0 may limit the coverage of the corresponding PUSCH transmissions. On the other hand, using only MCS equal to 28 may limit the throughput of PUSCH transmissions indicated by multi-subframe (MSF) grants.

Using the redundancy version index as a condition may not be suitable either, when considering that for each subframe there is only a one bit redundancy version that is currently discussed (cf. FIG. 6). Moreover, the redundancy version is common to both codewords in that subframe. Furthermore, using the number of assigned PRBs as a condition may be unsuitable in some cases since the resource block allocation is common to all subframes in both codewords. In addition, the minimum resource assignment for transmissions granted on an unlicensed carrier is currently 10 PRBs.

In order to overcome these problems, the present disclosure provides an efficient signaling for disabling a codeword by means of a multi-subframe DCI in multilayer configuration.

Disabling by MCS Level

In uplink LAA (unlicensed bandwidth), the minimum resource assignment is 10 PRBs. In general, the minimum resource assignment may be configured multiple of the smallest allocable unit in the system (PRB in LTE). Then the enabling/disabling of one or more codewords may be indicated by a particular MCS field value in combination with a condition concerning the number of allocated PRBs. Such exemplary conditions for disabling may be as follows:

The smallest MCS index (e.g., MCS=0, MCS indicating most robust modulation and coding rate) with a number of allocated PRBs being larger than the predefined or preconfigured smallest allocable multiple of PRBs (e.g., assigning more than 10 PRB for LAA).

The largest MCS index (e.g., MCS=28, MCS indicating the least robust modulation and coding rate) with a number of allocated PRBs being equal to the predefined or preconfigured smallest allocable multiple of PRBs (e.g., assigning 10 PRB for LAA).

For instance, in LAA with single subframe allocation (DCI format 4A) the above disabling conditions may be employed to disable a codeword. In DCI format 4A, the smallest allocation is also 10 PRBs. These conditions can be adapted to multi subframe allocation (DCI format 4B), so that the combination of smallest MCS index with assigning more PRB than the predefined or preconfigured smallest allocable unit determines that one codeword is disabled in each subframe scheduled by this DCI; and/or so that the combination of largest MCS index with assigning the predefined or preconfigured smallest allocable unit of PRBs determines that one codeword is disabled in each subframe scheduled by this DCI.

According to an embodiment, one or more of the MCS levels traditionally assigned to indicate redundancy version different from 0 are used to signal that the codeword is to be disabled. For instance, in LTE the MCS levels used to indicate redundancy version different from 0 are $I_{MCS}=29$, 30, 31.

However, it is noted that the present disclosure is not limited to the LTE/LTE-A system or its future developments. In general, in this embodiment, a field for signaling modulation and coding scheme with some values used for other purposes is reused to signal disabling of a codeword by re-interpreting the values for other purposes.

An exemplary control information in this embodiment comprises a resource grant for multiple subframes and a plurality of codewords for each subframe, as well as a modulation and coding scheme (MCS) indicator common for the granted multiple and individual subframes for each of the plurality of codewords. The MCS indicator can take one of a plurality of values including values indicating one of a plurality of MCSs and at least one value not indicating MCS. The MCS indicator for at least one of the plurality of codewords having a value not indicating MCS signals the disabling of a codeword.

For instance, the control information in case of two transmission layers includes two MCS fields (MCS1, MCS2) for the two respective codewords. The MCS table may be maintained the same as in the current LTE standard (cf. FIG. 5) and the control information may correspond to the dedicated control information (DCI) with a format to be used for multi-subframe grants (such as the above mentioned format DCI 4B). If one of the codewords is to be disabled for all granted subframes, the corresponding MCS field is set to a value among the redundancy version values 29, 30 and 31. For example, if MCS1 indicator has a value between 0 and 28, while MCS2 indicator has a value between 29 and 31, the first codeword CW0 is transmitted while the second codeword CW1 is disabled. On the other hand, if MCS1 indicator has a value between 29 and 31, while MCS2 indicator has a value between 0 and 28, the first codeword CW0 is disabled while the second codeword CW1 is transmitted.

However, other configurations are also possible. For instance, there may be a single particular value of MCS indicator not indicating MCS which disables a codeword.

For instance, only the value 31 from the above example may be used to disable the corresponding first or second codeword. The remaining values such as 29 and 30 may be used for a different purpose, such as signaling of the redundancy version or signaling of any other parameter. Choosing the value 29, i.e., the value associated with the least often utilized redundancy version (RV1) for retransmissions, can have a benefit since remaining values 30 and 31 could still be utilized for indicating a redundancy version 2 and 3, respectively, for the communication system as originally intended.

One of the advantages of the above described signaling is that a single layer beamforming is supported for multi-subframe grants. By reusing only some signaling point(s) of MCS being a part of the control information, no extra signaling bits are required for codeword disabling. This provides an efficient way of disabling codewords while still maintaining most meaningful link adaption possibilities.

However, the present disclosure is not limited by the above examples in which the codeword disabling is indicated only by a particular value of MCS indicator. For instance, in addition to the MCS level, the subframe dependent redundancy version (RV) field can be used to support subframe based codeword disabling. The redundancy version field may be included in the control information, as illustrated for instance in the above discussed FIG. 6, in which the redundancy version field in DCI format 4B is common for both codewords but separate (individual) for each subframe, and has a length of one bit.

In particular, the value of the codeword of specific MCS indicator (field) together with the value of the subframe specific RV field may jointly indicate codeword in enabling/disabling and the redundancy version to be applied.

For instance, if MCS1 has a value between 0 and 28 and MCS2 has a value of 29, if the first RV state (of the two states which can be distinguished by 1 bit, e.g., bit value 0) is indicated, then Codeword 1 is disabled. Codeword 0 employs MCS1 with RV2, meaning that the retransmission is performed assuming that an earlier transmission took place using RV0. On the other hand if the second RV (e.g., bit value 1) state is indicated, Codeword 1 is not disabled. Both codewords CW0 and CW1 are transmitted with MCS1 and RV2 which means that a retransmission is performed assuming an earlier transmission which employed RV0.

If MCS1 has a value between 0 and 28 and MCS2 has a value of 30, if the first RV state is indicated, then codeword one is disabled. Codeword 1 (CW1) uses MCS1 with RV0 (as the first transmission or retransmission, depending on the value of new data indicator, NDI, value). If on the other hand the second RV state is indicated, then codeword two is disabled while codeword one uses the MCS1 with RV0 (similarly, being either a transmission or new data transmission depending on NDI value).

Still further, if MCS1 has a value between 0 and 28 and MCS2 has a value of 31, if the first RV state is indicated, then Codeword 0 is disabled and the Codeword 1 uses the MCS1 with RV2 which means that a retransmission is performed assuming that the earlier transmission employed a redundancy version equal to 0 (RV0). On the other hand if the second RV state is indicated, then codeword two is disabled while codeword one uses the MCS1 with RV2.

It is noted that the above example is not to limit the present disclosure. It merely illustrates how the codeword disabling or enabling can be signaled on a subframe basis without including an additional field in the control information, by interpreting combination of MCS indicator value and redundancy version field value. In general, for two codewords, one MCS indicator (out of the two MCS indicators corresponding to the respective two codewords) indicates MCS for the enabled codeword. Another MCS indicator takes a value not indicating MCS but indicating together with the value of redundancy version field which of the two codewords is/are to be disabled, or that no codeword is to be disabled, and which redundancy version is to be applied to the enabled codeword.

Additional embodiments are possible with MCS1 taking values from 29 to 31 and MCS2 taking values from 0 to 28. For instance, application of further different redundancy version values may be signaled by such combinations.

In the above examples one of the advantages is that the MCS table as currently defined in LTE may be reused. Accordingly, the MCS indicator maintains the length of five bits resulting in the 32 possible MCS values. In the legacy uplink grant these values are used to indicate MCS (values 0-28) and redundancy version different from 0 (values 29-31). In the multi-subframe grant for uplink, these values may be used to indicate MCS (values 0-28) and enabling/disabling codewords (values 29-31). However, it is noted that these do not limit the present disclosure. In general, there may be more than two layers and, correspondingly, more than two codewords. Accordingly, the MCS may indicate which of the codewords is/are disabled in all subframes, or on a subframe by subframe basis (possibly using a combination of some MCS indicator values with RV field values as shown above for two codewords).

Moreover, in the above examples, the legacy MCS table has been reused also by employing all MCS indicating values (0-28) for MCS signaling, too. Only the special values 29 to 31 used in a legacy system for signaling redundancy version different from 0 were re-interpreted to indicate codeword disabling. However, the present disclosure is not to be limited by such MCS value mapping. For instance, some further values of MCS indicators may be used to signal codeword enabling/disabling.

It is noted that the present embodiment, in which one or more of the MCS field levels not indicating an MCS are used to signal that the codeword is to be disabled, is in general not limited to multiple subframe allocations. For instance, in LAA with single subframe allocation (DCI format 4A), this embodiment (and any of its above described examples, with exception of subframe-by-subframe solutions which are not applicable for the single subframe grant) may be employed. In this embodiment, the control information advantageously also includes a precoding indication common for the multiple subframes (for which the grant carried by the control information applies). This precoding indication may be a field in the control information corresponding to the field of legacy DCI format 4.

TPMI Determination

For multi-subframe scheduling supporting multilayer transmission, it is advantageous to include precoding information field as described above. Currently, in a single subframe scheduling, the precoding information is signaled within the precoding information field indicating transmission precoding matrix index (TPMI) together with a number of transmission layers.

The precoding information field in the DCI format 4 for use with two antenna ports has three bits enabling signaling of 8 combinations of the TPMI and number of layers assigned to 8 different values. The precoding information field in the DCI format 4 used with four antenna ports has six bits, thus enabling the combinations of TPMI and number of layers to take 64 different values. This is currently specified in Table 5.3.3.1.8-1 of the TS 36.212, v13.2.0, "Multiplexing and Channel Coding" from June 2016, available free of charge at www.3gpp.org and incorporated herein by reference.

FIG. 7 illustrates values of the precoding information field and the corresponding meaning of these values for two antenna ports (FIG. 7A) and four antenna ports (FIG. 7B). These tables correspond to the respective Tables 5.3.3.1.8-2 and 5.3.3.1.8-3 in the TS 36.212, v13.2.0. In particular, FIG. 7A shows two tables, one in the first two columns and another in the next two columns, the two tables being for the one enabled codeword and two enabled codewords, respectively. In the first and third column the value of the bit field of the precoding information is shown, which is included in the DCI. In the second and fourth columns, the corresponding associated combination of the number of layers and the TPMI is specified. For one enabled codeword, 6 different values of TPMI are selectable, corresponding to the indices 0-5 of the precoding information field. Indices 6-7 are reserved. If both codewords are enabled, only one TPMI is currently supported, corresponding to index 0, whereas the indices 1-7 are reserved.

In FIG. 7B, if one codeword is enabled, entries 0-39 indicate combinations of number of layers (which may be 1 or 2) with TPMI (which may take values 0-15). The precoding information field values 40-63 are reserved. On the other hand, when both codewords are enabled, the precoding information field values 0-28 indicate combinations of the number of layers (which may be 2 to 4) and TPMI (which may be 0 to 15). Values 29-63 are reserved.

TPMI for 2 antenna ports indicates which codebook index is to be used in Table 5.3.3A.2-1 of 3GPP TS 36.211, v13.2.0 "Evolved Universal Terrestrial Radio Access (E-UTRA); Physical channels and modulation", from June 2016 and TPMI for 4 antenna ports indicates which codebook index is to be used in Table 5.3.3A.2-2, Table 5.3.3A.2-3, Table 5.3.3A.2-4 and Table 5.3.3A.2-5 of the TS 36.211. The codebook indices are associated with particular precoding matrices.

In order to maintain the overhead cost for the signaling information as low as possible and, at the same time, maintain the new DCI (4B) similar to the legacy DCI (4), it would be beneficial to keep the same precoding information field length. This is particularly beneficial if the channel conditions are not expected to change, or if no information about changing channel conditions is available. On the other hand, it could be beneficial to provide number of layers and TPMI for individual subframes to have finer control about the transmission parameters, which is particularly beneficial if different channel conditions over the scheduling period can be expected.

As described above, it is possible to enable/disable one codeword on a subframe basis. Accordingly, it is desirable to signal precoding information at least for the two different cases—one codeword enabled or both codewords enabled.

According to a first example a second precoding information field may be provided, which indicates the TPMI for subframes with only one enabled codeword (here it is assumed that a first precoding information field for both codewords enabled is also included in the DCI). The second field may indicate number of layers and TPMI in a similar way as shown in FIG. 7. In other words, DCI including a multi-subframe grant may indicate on a subframe basis whether either 1 or 2 codewords are enabled. Correspondingly, two precoding information fields may be provided, a first one for indicating number of layers and TPMI for both codewords enabled and a second one for indicating number of layers and TPMI for only one codeword enabled. These two precoding information fields may be defined similarly as shown in FIG. 7.

However, alternatively, in order to reduce signaling data requirements, a limited number of bits may be used to dynamically choose between pre-configured combinations. The term "limited" here means that the number of combinations is smaller than the number of combinations specified for the precoding information for the case of scheduling by DCI Format 4 (e.g., on a licensed carrier).

Exemplarily referring to the left part of the table in FIG. 7B, the number of selectable TPMIs for each number of transmission layers is sub-sampled to reduce the total number of choices. For example, instead of allowing the full choice of TPMI values 0-23 for 1 layer transmissions, only even-numbered TPMI values 0, 2, 4, . . . , 22 are available (or alternatively, only odd-numbered TPMI values 1, 3, 5, . . . , 23 are available). Likewise, for 2 layer transmissions, only even-numbered TPMI values 0, 2, 4, . . . , 14 are available (or alternatively, only odd-numbered TPMI values 1, 3, 5, . . . , 15 are available). In this way, a total number of 20 values are available, which can be signalled by a field of 5 bits (instead of 6 bits for the full choice of 40 values).

The sub-sampling doesn't have to be in regular patterns (such as every 2nd value, or every 3rd value) as this generally doesn't fully exploit the capacity of a bit field signal; as just mentioned, a sub-sampling by a factor of 2 would require a field size of 5 bits, whereas the sub-sampling would exploit only 20 out of 32 possible states. Exploiting all 32 states could exemplarily be achieved by selecting 16 TPMI values for 1 layer transmission (out of the 24 defined TPMI values) and keeping the 16 TPMI values for 2 layer transmission. Such an uneven sub-sampling would be beneficial to support more optimised 2-layer transmissions. An alternative would to keep the 24 TPMI values for 1 layer transmission and selecting 8 TPMI values for 2 layer transmission (out of the 16 defined TPMI values); the latter could be easily achieved by sub-sampling the 16 values by a factor of 2 (e.g., selecting only the even-numbered TPMI, or only the odd-numbered TPMI). Such an approach would guarantee the full TPMI choice for 1 layer transmissions, which is beneficial for achieving an optimum SINR for enhanced coverage of the uplink signal. Similarly, if, e.g., only 3 bits should be used for the second precoding information field, then the total number of 40 different combinations of number of layers and TPMI need to be sub-sampled to 8 combinations. This might be achieved by sub-sampling the 24 defined TPMI for 1 layer by a factor of 3, and not including any TPMI for 2 layers.

One further advantage of including a second precoding information field, applicable to subframes where one codeword is enabled and one codeword is disabled, is that the size of the first precoding information field could be reduced. Since the first precoding information field only needs to cover the case of two enabled codewords, for the 4 antenna port case only states 0-28 need to be represented. These 29 states can be represented by 5 bits, therefore one bit could be saved compared to the precoding information field size in DCI Format 4 for the four antenna port case. For the two antenna port case, including the first precoding information field in the DCI even becomes superfluous, in other words a size of 0 bits for the field is sufficient, since only a single layer and TPMI combination is defined.

This approach can also be extended for the case that more than two codewords per subframe are supported. Then a first precoding information field is provided applicable to those subframes where no codewords are disabled, a second precoding information field is provided applicable to those subframes where a first non-zero number of codewords are disabled, a third precoding information field is provided applicable to those subframes where a second non-zero number of codewords are disabled, and so forth. In other words, the number of precoding information fields is generally upper-bounded by the maximum number of codewords which may be enabled in a subframe, and preferably corresponds to the maximum number of codewords which may be enabled in a subframe.

According to a second example, the precoding information for one codeword is configured semi-statically, for instance by radio resource control protocol, RRC. In other words, the precoding information for both codewords (cf. FIGS. 7A and 7B on the right hand side) is included in the DCI carrying a multi-subframe grant, while the precoding information for only one codeword enabled is signaled by the RRC. The TPMI for the two-codeword case is mainly targeted at minimizing the interference between the two codewords, and the TPMI for the one-codeword case is mainly targeted at improving the SINR through beamforming. In many scenarios, the optimum beam direction for beamforming corresponds to the line of sight between transmitter and receiver, which is relatively static for a rather stationary terminal. Conversely, in many scenarios the optimum precoder for minimizing intercode-interference attempts to decorrelate channels as much as possible, which is much more depending on obstacles in the radio wave propagation environment, and which can therefore be expected to be more fluctuating. For those reasons, it would be most efficient to defer the precoding information for one enabled codeword to semi-static RRC signaling, while the precoding information for two enabled codewords is preferably indicated in the DCI and can consequently be adapted relatively fast to changing channel conditions.

Alternatively, the precoding information for two enabled codewords could be configured by semi-static signaling, and the precoding information for one enabled codeword is included in the DCI format. This is particularly applicable if the number of available choices for the number of layers and TPMI is substantially higher for the one-codeword than for the two-codeword case. For example, with reference to FIG. 7A, there is only one valid entry for the two-codeword case. From that perspective, it would be even possible to operate without a corresponding precoding information field in the DCI. Conversely, there are 6 different entries to choose from for the one-codeword case, so that it could be expected that even small channel condition changes could result in a different optimum TPMI choice.

The semi-static signaling may be carried by terminal specific RRC messages at a setup of radio access bearer or anytime afterwards with its reconfiguration.

This example and alternative can also be extended to the case of more than 2 codewords per subframe, where the precoding information for a first and a second number of disabled codewords is each conveyed by semi-static configuration, and the precoding information for a third number of disabled codewords is conveyed by the DCI. Alternatively, the precoding information for a first and a second number of disabled codewords is each conveyed by the DCI, and the precoding information for a third number of disabled codewords is conveyed by semi-static configuration.

According to a third example, precoding information candidates for one codeword are configured semi-statically. Moreover, the particular choice of the precoding information among the semi-statically pre-configured candidates is signaled dynamically, for instance by using some values of MCS and/or RV. For example, MCS values 29, 30 and 31 may be used to indicate selection of the first, second and third candidate respectively. The first, second and third candidates may be configured by the RRC by assigning to them particular combination such as those defined in the tables of FIG. 7.

In another specific example to the third example, MCS values 29, 30 and 31 together with a first RV value may be used to indicate selection of the first, second and third candidate respectively, while MCS values 29, 30 and 31 together with a second RV value may be used to indicate selection of the fourth, fifth and sixth candidate respectively. The first through sixth candidates may be configured by the RRC by assigning to them particular combinations such as those defined in the tables of FIG. 7.

The third example can be extended to the case of more than two supported codewords where at least one codeword is disabled. The number (and index) of disabled codewords can be determined from the knowledge whether the corresponding MCS field contains a value of 0-28 (i.e., assigns a modulation and coding scheme) or contains a value of 29-31. This opens up further dimensions for the number of semi-statically pre-configured candidates for the number of layers and precoding. For example, in a case of three supported codewords and correspondingly three MCS fields, the case of one enabled and two disabled codewords is characterized by the first MCS field taking values 0-28, and the second and third MCS fields each taking values of 29-31. Consequently, the two MCS fields each indicating 29-31 jointly offer 9 different choices, which can be used for representing 9 different combinations of number of transmission layers and TPMI. Additionally using the RV field can further increase the number of configurable combinations.

According to a fourth example, one single precoding information field is included in the DCI to signal the precoding information for both two enabled codewords and one enabled codeword. The precoding information field is similar to the precoding information field used in legacy system for DCI format 4 for two codewords, i.e., for 4 antenna ports has 6 bits and 29 possible values, the rest is reserved. The values 0-28 represent indexes to combinations of the number of layers and the TPMI value. Values 29 to 63 are reserved. In this example, the reserved values are used to convey individual candidates for only one enabled codewords. Accordingly, for a two-codeword transmission with both codewords enabled, the values 0-28 indicate the same combinations of the TPMI and number of layers as if used by DCI format 4. For only one codeword enabled, the values 29-56 indicate combinations (TPMI and number of layers) for the enabled one codeword. The combinations associated with the values 0-28 may be the same as the respective combinations associated with the values 29-56, respectively. The remaining values 57-63 may be used for another purpose. Alternatively, the remaining values may be used to provide more selectable combinations.

Denoting the value indicated by the precoding information field as $I_{L,TPMI}$, the following gives a specific example according to the fourth example to determine the number of layers and TPMI. For the four antenna port case, and for two enabled codewords, the number of layers and TPMI is determined by means of the Table in FIG. 7B, using ($I_{L,TPMI}$ mod 29) for looking up in the column "Bit field mapped to index". Therefore $I_{L,TPMI}=0$ and $I_{L,TPMI}=29$ both indicate that 2 layers and TPMI=0 are to be used for the assigned transmission; similarly $I_{L,TPMI}=17$ and $I_{L,TPMI}=46$ both indicate that 3 layers and TPMI=1 are to be used for the assigned transmission. For a subframe where one codeword is enabled and one codeword is disabled, $I_{L,TPMI}=\{0\text{-}28\}$ would indicate that a first combination of the TPMI and number of layers are to be used for the assigned transmission, while $I_{L,TPMI}=\{29\text{-}56\}$ would indicate that a second combination of the TPMI and number of layers are to be used for the assigned transmission. Preferably the first and second combination (and others, if applicable) are selected from the set of combinations that are available for the single-subframe scheduling case and one disabled codeword, e.g., are chosen from the set of combinations in the left part of the table in FIG. 7B ("message"). This selection is preferably defined a-priori through a fixed specification, or configurable by semi-static signaling to allow a terminal-specific and time-adaptable choice of combinations that are most suitable to the specific channel conditions.

In a specific example for the two antenna port case, for two enabled codewords, the number of layers and TPMI is determined by means of the Table in FIG. 7A, using ($I_{L,TPMI}$ mod 1) for looking up in the column "Bit field mapped to index". Therefore $I_{L,TPMI}=\{0, 1, 2, 3, 4, 5, 6, 7\}$ all indicate that 2 layers and TPMI=0 are to be used for the assigned transmission (this is admittedly trivial due to the specific case that only one number of layers and TPMI is defined for this case). For a subframe where one codeword is enabled and one codeword is disabled, $I_{L,TPMI}=\{0\}$ would indicate that a first combination of the TPMI and number of layers are to be used for the assigned transmission, while $I_{L,TPMI}=\{2\}$ would indicate that a second combination of the TPMI and number of layers are to be used for the assigned transmission, and so forth. Preferably the first, second, and other combination (where applicable) are selected from the set of combinations that are available for the single-subframe scheduling case and one disabled codeword, e.g., are chosen from the set of combinations in the left part of the table in FIG. 7A ("message"). This selection is preferably defined a-priori through a fixed specification, or configurable by semi-static signaling to allow a terminal-specific and time-adaptable choice of combinations that are most suitable to the specific channel conditions. In this specific example, where there is a total of 6 combinations for one enabled codeword defined, and where the precoding information field can represent 6 or more combinations (8 in this specific example) it is therefore possible to indicate all 6 defined combinations without the need of any semi-static configurability.

According to a fifth example, a second precoding information field is not included in the DCI carrying multi-subframe allocation. The number of layers and precoding information for the case of two enabled codewords in a subframe is then determined according to the precoding information field that is included in the DCI format 4B (for a multi-subframe allocation). The number of layers and precoding information for the case of one enabled codeword in a subframe is then determined from the precoding information in the most recently signaled DCI format 4A (for one-subframe allocation). This example presumes that the channel conditions and therefore suitable combinations of the TPMI and number of layers are changing substantially over time, which is safe to assume at least for rather stationary terminals.

According to a sixth example, a fixed mapping is introduced between signaled precoding information combinations for both enabled codewords and applicable combinations for a single enabled codeword. In other words, one precoding information field is included in the multi-subframe DCI (format 4B) similarly as for the DCI format 4. This precoding indication signals TPMI and number of layers combination for two enabled codewords. Thus, the subframes for which both codewords are enabled, make use of this signaled combination. The subframes which have only one of the two codewords enabled apply a combination which is determined according to a fixed mapping of the signaled combination for both enabled codewords to the applicable combination for the single enabled codeword.

In the above examples the codewords can be disabled or enabled on a subframe basis. Moreover, precoding information is advantageously signaled for the different number of enabled codewords separately. The above examples have been presented embedded into the existing LTE system. However, it is noted that the present disclosure is not limited to LTE, or to at most two codewords, or to the precoding information signaled as shown in FIG. 7. Rather, it is applicable to any system with multi-subframe allocations using MIMO with precoding enabling mapping of more than one codewords into one subframes. In such system, one or more codewords may be disabled on a subframe basis by using values of modulation and coding scheme indicator which are not associated with a particular MCS, possibly combined with specific values of other signaled parameters such as redundancy version. Correspondingly, the precoding information may be signaled for each of such configurations (one codeword disabled, two codewords disabled, three codewords disabled, etc.). Such signaling may be provided in accordance with the above mentioned examples, for instance by explicitly including the precoding information field for each configuration into the DCI, or by configuring the precoding information for each such configuration semi-statically, or by combination of including into DCI and semi-static signaling, or by reusing reserved fields or the like.

Alternatively, the information whether one codeword is disabled or two codeword are enabled is conveyed by the precoding information field. This alternative is applicable to single subframe scheduling, as well as to multi-subframe scheduling, where the enabling or disabling of codewords would be applied to all subframes scheduled by the corresponding DCI. A first set of precoding information values implies that one codeword is disabled, and a second set of precoding information values implies that two codewords are enabled. For example for the two antenna port case with reference to FIG. 7A, the first set consists of 6 values and corresponding interpretation shown in the two leftmost columns, and the second set consists of 1 value and corresponding interpretation in the two rightmost columns. In total there are therefore 7 values, i.e., the size of 3 bits for the precoding information field can be kept. Denoting the value indicated by the precoding information field as $I_{L,TPMI}$, the following approach can be used:

For $0<=I_{L,TPMI}<=5$: Codeword 0 is enabled; Codeword 1 is disabled; Determine number of layers and TPMI according to $I_{L,TPMI}$ in the two leftmost columns.

For $I_{L,TPMI}=6$: Codeword 0 is enabled; Codeword 1 is enabled; Determine number of layers and TPMI according to $I_{L,TPMI}-6$ in the two rightmost columns.

For example for the four antenna port case with reference to FIG. 7B, the first set consists of 40 values and corresponding interpretation shown in the two leftmost columns, and the second set consists of 29 values and corresponding interpretation in the two rightmost columns. In total there are therefore 69 values, i.e., the size of the precoding information field is 7 bits. Denoting the value indicated by the precoding information field as $I_{L,TPMI}$, the following approach can be used:

For $0 \leq I_{L,TPMI} \leq 39$: Codeword 0 is enabled; Codeword 1 is disabled; Determine number of layers and TPMI according to $I_{L,TPMI}$ in the two leftmost columns.

For $40 \leq I_{L,TPMI} \leq 68$: Codeword 0 is enabled; Codeword 1 is enabled; Determine number of layers and TPMI according to $I_{L,TPMI}-40$ in the two rightmost columns.

In this approach, the sets could be reduced (sub-sampled) so that a smaller number of bits in the precoding information field can be realised. For example, considering the above case of four antenna ports, it could be desirable to keep the number of 6 bits for the precoding information field for commonality in the system. This would support a set size of 64 combinations, i.e., 69−64=5 combinations would need to be removed compared to the full set of combinations. Such sub-sampling could be applied for instance as described above with reference to the first example.

The present disclosure also provides an apparatus 810 for receiving a resource grant for multiple subframes in a communication system 800. Such apparatus may be a mobile station (user equipment, UE) of any sort such as a cellular phone, smartphone, USB adapter, computer, tablet, laptop, a wearable such as smart watches or glasses, or the like. The communication system is advantageously an LTE or LTE-A system. However, the present invention is not limited to an LTE system. Rather, any 4G or 5G system may make use thereof, as well as any systems like WiFi, WiMax or the like, which employ multiple antennas and the corresponding signaling.

Figure 9A:
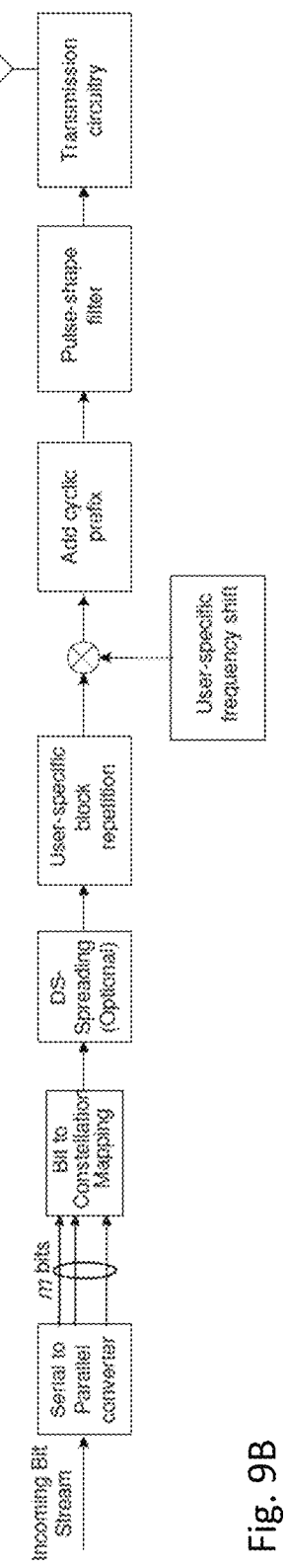
FIGS. 9A and 9B is a block diagram illustrating exemplary OFDM transmitter for uplink and downlink, respectively.
Figure 9B:
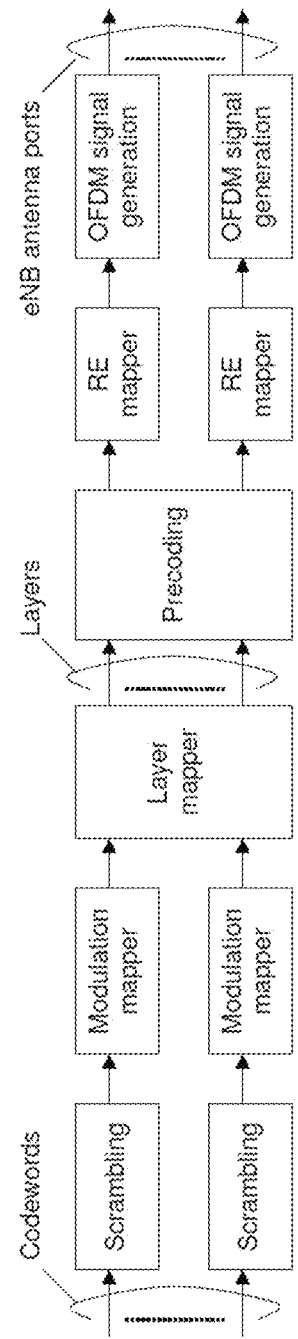

The apparatus comprises a transceiver 820 for receiving signal 855 comprising control information. The transceiver may be, for instance, a transceiver capable of receiving and transmitting an LTE/LTE-A-compatible signal. FIG. 9 exemplifies possible uplink transmission processing (FIG. 9A) and possible downlink transmission processing (FIG. 9B) in LTE. However, it is noted that these are mere examples. In general, the transceiver 820 includes one or more antennas, the corresponding circuitry for controlling their gain and a mapper of user data, control data and reference signals onto the physical resources.

The control information included in the signal 855 includes a resource allocation indication for multiple subframes and a plurality of codewords for each subframe. The resource allocation may indicate the location of the resources for the transmission in the time domain and/or the frequency domain. The number of subframes for which the resource allocation is valid may be also signaled within the control information as exemplified in FIG. 6. However, it is noted that the present disclosure is not limited thereby and the number of subframes may also be pre-configured in another way (e.g., semi-statically) or pre-defined. The plurality of codewords may be two or more, of which some may be disabled.

The control information further includes a modulation and coding scheme, MCS, indicator common for the allocated multiple subframes and individual for each of the plurality of codewords. The MCS indicator takes one of a plurality of values including values indicating one of a plurality of MCSs and at least one value not indicating MCS. The MCS indicator may be a field with a predefined bit length, resulting in a set of values. Some of the values are associated with particular respective modulations (or, more specifically, modulation orders in case the modulation type is the same) and size of the transport block(s) mapped onto the allocated resources (determined by the coding applied). Some of the values are not associated with coding or modulation. They may be used for different purpose or reserved. In the above UL LTE example, the values 29-31 are used for signaling redundancy version.

Once the control information is received as a part of the signal 855 by the transceiver 810, a processing device 830 which is a part of the apparatus 810 further processes the control information. In particular, the processor 830 is configured to determine that a codeword from the plurality of codewords in the multiple subframes is disabled if the MCS indicator for at least one of the plurality of codewords has a value not indicating MCS and that it is not disabled otherwise. This does not necessarily mean that the MCS indicator not indicating an MCS always means disabling. In one embodiment this may be the case. In other embodiments, the MCS indicator not indicating MCS may only in combination with another parameter value indicate disabling, as will be shown below.

The processing device 830 may be a single processor or a plurality of processors. It may be an integrated circuit or a programmable hardware or a combination of such devices. Such processing device 830 may extract the control information from the signal received by the transceiver 820 and further extract particular fields of the control information carrying configuration values. As mentioned above, the signal 855 may correspond to a downlink signal transmitted from an eNB to the terminal, the control information may correspond to the DCI, the MCS indicator may correspond to the MCS field, precoding information may correspond to the combination of TPMI and the number of layers in the current LTE or LTE-A system.

In compliance with the PUSCH MCS table applied in the LTE, in one embodiment the plurality of values includes 32 indexed values out of which three with the highest indexes do not indicate MCS and are usable to indicate disabling of a codeword for the multiple subframes. In particular, the 32 values may be given by all 5-bit combinations so that the MCS indicator is 5 bits long, i.e., a field of 5 bits is included into the DCI. Moreover, a predefined or preconfigured number of values out of the 32 values may be associated with particular respective MCSs (in LTE 29, namely the values 0-28), while the remaining values are not associated with any particular MCSs (in LTE 3, namely 29-31). The value 32 is beneficial since it enables reuse of the MCS tables already defined in the LTE. However, the present invention is not limited by this example and the number of values may be higher or lower, depending on the number of bits provided for the signaling of the MCS in the control information. An advantage of this approach in the LTE example is that the number of configurable MCSs is not further reduced, but rather values indicating redundancy version are utilized. The RV values are no longer needed if the RV is signaled separately as exemplified in FIG. 6, for each subframe.

In other words, legacy terminals may use MCS table for indicating MCS and/or RV, while the terminals configured to support multi-subframe allocation may use (interpret) the same MCS table for indicating the MCS in the same way as legacy terminals and for indicating disabling a codeword.

Beneficially, the control information further comprises a redundancy version indication individual for each of the multiple subframes and common for all codewords in the respective subframe. The processing device is then configured to determine that a codeword from the plurality of codewords in the multiple subframes is disabled if the MCS indicator for at least one of the plurality of codewords has a value not indicating MCS and the redundancy version indication has a first predefined value. The codeword or a plurality of codewords is not disabled otherwise, i.e., when the MCS indicator takes a value which indicates a particular MSC among a plurality of configurable MCSs in combination with other values of the redundancy version indicator signaled per subframe and indicating one of the configurable redundancy versions. As is clear to those skilled in the art, even though in the above LTE-specific examples, the length of the redundancy version indicator for subframes in a multi-subframe DCI was 1 bit (indicating selection between RV=0 and 2—the two most important RVs in terms of performance), this is not limiting the present disclosure. Redundancy version may also be 2 bits long as in the legacy DCI, indicating RVs from 0 to 3, or may be of any other length for systems requiring more redundancy versions.

As explained above, in a subframe in which one codeword is enabled and one codeword is disabled, the processing device is advantageously configured to determine a redundancy version for the enabled codeword based on the particular value not indicating MCS, which is used to indicate disabling of the disabled codeword together with the redundancy version indication. In other words, the MCS indicator with the RV indicator, both of which are included in the control information, jointly indicate the disablement or enablement of a codeword and the RV for that codeword.

In a subframe in which two codewords are enabled and no codeword is disabled, the processing device may be configured to determine the MCS for the enabled codewords based on the particular value indicating MCS such as the values 0-28 in the above examples relating to LTE. Such value is not used to indicate disabling of the disabled codeword, possibly together with the redundancy version indication.

The control information may further include a precoding information field common for the multiple subframes for which the control information indicates allocation (grant). The precoding indication field may indicate TPMI and/or the number of layers. It is noted that in the above examples, the precoding information field indicated this combination of the TPMI and the number of layers, since in the current LTE, there is a similar precoding information field. However, the present disclosure is not limited by these examples. Rather, the precoding information field may include only TPMI and the number of layers may generally be signaled by another field or implicit, or signaled on another layer. On the other hand, the precoding information may signal further settings.

In an embodiment, the precoding information is indicating a combination of transmitted precoding matrix indication, TPMI, and number of transmission layers. This may be performed in various different ways.

For instance, in one example, the precoding information may be indicating a combination of TPMI and number of transmission layers out of a plurality of predefined combinations of TPMI and number of transmission layers. These combinations may be predefined in a standard specification and known for both the receiver and transmitter.

In another example, the precoding information may be indicating a combination of TPMI and number of transmission layers out of a plurality of combinations of TPMI and number of transmission layers in a candidate set preconfigured by means of a semi-static signaling. In particular, an RRC message from the base station to the terminal may configure a candidate set of indexes associated with the respective combinations of the TPMI and number of layers. The number of the combinations in the candidate set is advantageously smaller than all possible combinations and/or than all configurable configurations. The candidate set may be selected for instance based on the channel conditions, interference, terminal capabilities or any other parameters. The control information then carries a precoding information field which has a smaller length in bits to enable signaling of only the values in the pre-configured candidate set. For instance, if there is a number of 32 combinations generally possible, in order to signal them, precoding information would require 5 bits. However, the candidate set may only include 4 candidate combinations pre-configured by the RRC and then, only 2 bits are necessary to select a combination among the candidates within the dynamically signaled precoding information.

In still another example, the precoding information is indicating a combination of TPMI and number of transmission layers either out of a plurality of predefined combinations of TPMI and number of transmission layers which are also selectable for a single-layer configuration using a single codeword per subframe or out of a plurality of predefined combinations of TPMI and number of transmission layers which are not selectable for the single-layer configuration, wherein the values of the precoding indication indicating respective combinations of TPMI and number of transmission layers not selectable for the single-layer system are reserved values in a precoding indication of the single-layer configuration.

In other words, the transceiver is configured to receive a radio resource control protocol configuration information including precoding configuration, and the processing device is further configured to configure the precoding parameters according to the received precoding configuration.

Figure 8:
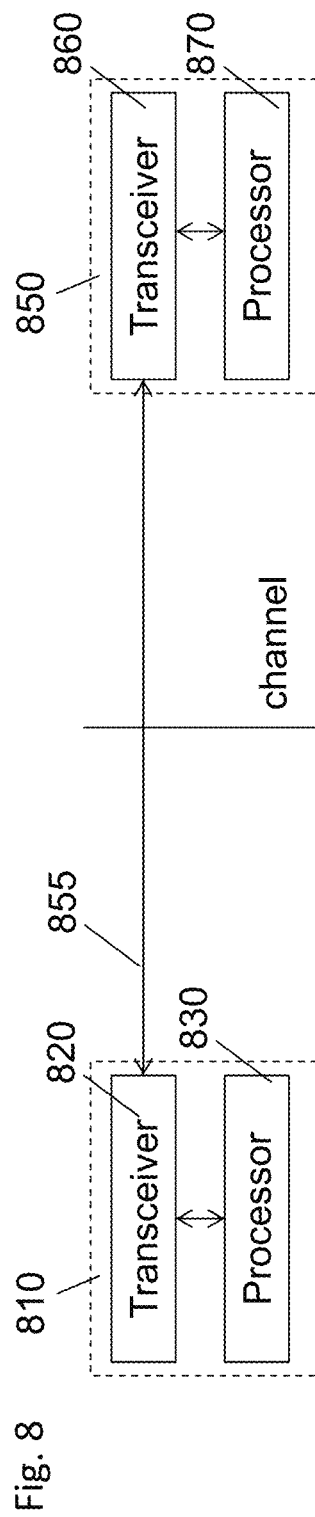
FIG. 8 is a block diagram illustrating apparatuses according to an embodiment.

In FIG. 8, an apparatus 850 is also shown, which is for transmitting a resource grant for multiple subframes in a communication system. This apparatus may be a network node or a base station, or a terminal handling as an access point, or any other scheduling entity. In LTE, this apparatus may correspond to the eNB.

The apparatus 850 comprises a processing device 870 configured to set a modulation and coding scheme, MCS, indicator to a value not indicating MCS to indicate that a codeword from the plurality of codewords in the multiple subframes is to be disabled. For instance, the apparatus may be a scheduling entity which selects for another apparatus transmission configuration and provides the selected configuration to the other apparatus via control information. This configuration may include for instance physical layer parameters such as modulation and coding settings, MIMO settings such as number of layers, precoding matrices and the like, allocation of resources, HARQ configuration, etc.

The apparatus 850 further comprises a transceiver 860 for transmitting signal comprising the control information including at least the resource grant for multiple subframes and a plurality of codewords for each subframe, a precoding indication common for the multiple subframes, the MCS indicator common for the granted multiple subframes and individual for each of the plurality of codewords, the MCS indicator taking one of a plurality of values including values indicating one of a plurality of MCSs and at least one value not indicating MCS.

The processing device 870, similarly as the processing device 830 may be one or more processors and/or one or more integrated circuits and/or programmable hardware or the like, configured or programmed to perform the above mentioned tasks. It is noted that the processing device 870 may be further advantageous to select values of the control information and its respective fields as is described above with reference to the apparatus 810 and its extracting/processing the control information.

A communication system is also provided as shown in FIG. 8, comprising an apparatus 810 for receiving control information and an apparatus 850 for transmitting the control information for controlling the transmission of data by the apparatus 810 over a channel. The channel may be at least in part a wireless channel. The system may be a part of the communication system, which can be for instance an LTE, LTE-A, further developments of the LTE such as LAA, or any other system which includes wireless link Disabling by a Dedicated Field According to an embodiment, the codeword enabling/disabling is indicated explicitly and valid for each subframe of the corresponding resource assignment. In particular, the control information may include a dedicated codeword enabling/disabling field which indicates the enabling and/or disabling of the codewords for each subframe that is assigned by the resource assignment. Preferably, the dedicated codeword enabling/disabling field consists of a single bit in the control information, where the first bit state (e.g., bit value=0) indicates that one codeword is enabled and one codeword is disabled, and where the second state (e.g., bit value=1) indicates that two codewords are enabled. This enabling/disabling is then applied in each subframe that is assigned by the control information, and the embodiment is therefore applicable to single subframe assignments as well as multi-subframe assignments. In other words, the enabling/disabling of codewords is indicated explicitly in a multi-subframe DCI by including therein the corresponding enabling/disabling field common for all subframes.

According to another embodiment, the codeword enabling/disabling is indicated explicitly and individually for each subframe. In particular, the control information may include a dedicated codeword enabling/disabling field which indicates the enabling and/or disabling of the codewords for each subframe.

In one example, a codeword enabling/disabling bitmap is provided, in which each bit represents a subframe and the value of the respective bit indicates whether a codeword is enabled or disabled for the respective subframe. This may be performed by the one bit when set to 0, indicating that one codeword is disabled and when set to 1 indicating that both codewords are enabled (or vice versa)—in case there are only two codewords configurable.

In other words, the codeword enabling/disabling field (bitmap) indicates whether the respective subframe uses one or two codewords, assuming that there is a maximum number of codewords equal to 2. Accordingly, depending of the configured value of number of subframes for which one scheduling message is provided (number of subframes in the multiple subframes), the bitmap may have a length of for instance two, three, four or more bits, typically not more than 10.

It is noted that the present disclosure is not limited to the case in which there are only two codewords configurable as is the case in the above described LTE examples. The bitmap may be provided per subframe and codeword in order to indicate enabling/disabling a higher number of codewords. In case of a higher number of codewords, it is assumed that for each codeword, one MCS field is included in the DCI.

In this embodiment, advantageously the modulation and coding scheme indicator that takes values 0 to 28 is applied for selecting the modulation and coding scheme in both cases for two-codeword transmission (when both codewords are enabled) and one-codeword transmission (when only one codeword is enabled). In other words, the MCS with index value 0 to 28 is applied to both codewords in a subframe if two-codeword transmission is indicated by the codeword enabling/disabling field for that subframe, as well as to one codeword in a subframe if one-codeword transmission is indicated by the codeword enabling/disabling field for that subframe.

The codeword disabling does not necessarily need to be indicated by a bitmap. Alternatively, the field indicating whether the codewords in the individual subframes are enabled or disabled may indicate the number and/or identity of the codewords which are disabled. Alternatively, the field may indicate the number and/or identity of the codewords which are enabled.

For example, for each subframe the codeword enabling/disabling field can represent two states: (1) two codewords enabled; (2) one codeword enabled and one codeword disabled. In such an example, it could be assumed that if only one codeword is enabled, that the first codeword is enabled and the second codeword is disabled. Such a field would in total require a number of exp(2, n) states for n subframes, which could be represented by a field of length n bits.

In another example, for each subframe the codeword enabling/disabling field can represent three states: (1) two codewords enabled; (2) Codeword 0 enabled and Codeword 1 disabled; (3) Codeword 0 disabled and Codeword 1 enabled. Such a field would in total require a number of exp(3, n) states for n subframes, which could be represented by a field of length $\text{Ceil}\{\log_2(\exp(3, n))\}$ bits.

In another example, for each subframe the codeword enabling/disabling field can represent four states: (1) two codewords enabled; (2) Codeword 0 enabled and Codeword 1 disabled; (3) Codeword 0 disabled and Codeword 1 enabled; (4) Codeword 0 disabled and Codeword 1 disabled. Such a field would in total require a number of exp(4, n) states for n subframes, which could be represented by a field of length 2n bits.

Concerning the precoding information, the above described options may also be applied to this embodiment. In other words, the precoding information may be indicated in the control information by inserting therein a precoding information field. The precoding information field may be inserted separately for configuring one-codeword transmission and two-codeword transmission. Reference is made to Subsection "TPMI determination" above for details of such precoding information.

However, the precoding information may be indicated in a different way. For instance, one precoding information field may be included into the control information, the precoding information field indicating precoding information for two-layer configuration in which both codewords are enabled. This precoding information is then applied to those subframes in which both codewords are enabled. Moreover, the reserved MCS entries 29 to 31 may be used to obtain precoding configuration for one-codeword transmissions, i.e., configuration for subframes in which only one of the two codewords is enabled (in which one codeword is disabled).

In particular, for the one-codeword transmission, if MCS1 is equal to 29 to 31, there is a choice between three possible configurations (combinations of TPMI and number of layers). If MCS2 is equal to 29 to 31, there is a choice between three further configurations. Accordingly, the base station can dynamically choose between six precoding configurations for the one-codeword case. As mentioned above, the six possible values may also indicate a combination of a TPMI and a number of layers. However, the present invention is not limited thereto and the precoding information may merely convey a precoding matrix indication. The number of layers may be indicated in another way.

Advantageously, the assignment of the combinations of TPMI and number of layers to the MCS1 and MCS2 is controlled semi-statically. In other words the MCS1 and MCS2 values 29-31 are assigned a candidate set values which are signaled by RRC. Then the dynamic signaling within the control information carrying grants merely selects the combinations from the pre-configured candidate set.

It is noted that the above described setting of the precoding information based on the MCS field values not indicating an MCS is not usable only in the case when the enabling/disabling of the codewords per subframe is explicitly signaled. Rather, irrespectively of the way how the enabling/disabling of the codewords is signaled, the MCS field values not used to signal MCS (also not in the legacy communication such as one-layer communication without MIMO or in the single-subframe DCIs, in particular DCI format 4) may be used to indicate precoding information. It is noted that when looking at the MCS table in FIG. 5, one could also define the MCS field values 29, 30, and 31 as those values, which are not used to signal transport block index or modulation.

According to this embodiment, the apparatus 810 for receiving a resource grant for multiple subframes in a communication system comprises a transceiver 820 for receiving signal comprising control information. The control information includes the resource grant common for multiple subframes and a plurality of codewords for each subframe, and a codeword indication indicating enabling or disabling of one or more codewords for each of the multiple subframes. The apparatus 810 further comprises a processing device 830 configured to determine for each subframe whether a codeword from the plurality of codewords in said subframes is enabled or disabled according to the codeword indication.

For instance, the codeword indication is a bitmap including an individual bit for each of the multiple subframes, each individual bit indicating either one or two enabled codewords.

However, the bitmap is only one of the examples. Alternatively, the codeword indication is either an identifier of the codewords which are disabled or an identifier of the codewords which are enabled. It may be beneficial, especially if there are more than 2 codewords configurable for transmission, to also include the number of either disabled or enabled codewords respectively into the codeword indication. In some systems, it may be advantageous to only signal either the number of disabled codewords or the number of enabled codewords and assuming that the disabled codewords are those with the highest indices.

Moreover, in this embodiment, the control information advantageously further comprises a modulation and coding scheme, MCS, indicator common for the granted multiple subframes and individual for each of the plurality of codewords, the MCS indicator taking one of a plurality of values including values indicating one of a plurality of MCSs and at least one value not indicating MCS, while the processing device is further configured to determine modulation and coding scheme for each enabled codeword according to the MCS indicator taking a value indicating one of the plurality of MCSs.

The processing device may be configured to determine precoding configuration, in case a single codeword is enabled, based on the MCS indicator taking a value not indicating one of the plurality of MCSs, or to determine which codeword is disabled based on the MCS indicator taking a value not indicating one of the plurality of MCSs or based on the redundancy version indicator for the subframe in which a single codeword is enabled.

Correspondingly to the control information receiving apparatus 810, also in this embodiment, an apparatus 850 for transmitting a resource grant for multiple subframes in a communication system is provided.

The apparatus 850 comprises a processing device configured to select for each subframe whether a codeword from the plurality of codewords in said subframes is enabled or disabled and to set a codeword indication accordingly; and a transceiver for transmitting a signal comprising a control information including the resource grant common for multiple subframes and a plurality of codewords for each subframe, the codeword indication indicating enabling or disabling of one or more codewords for each of the multiple subframes.

The further characteristic of the control information are the same as described above with reference to the corresponding control information receiver. The control information transmitting apparatus is advantageously the scheduling device such as base station or network node (eNB in LTE has both these functions). It typically does not only transmit the control information, but also selects the control information parameter values with which the control information receiving apparatus is then configured.

Figure 10:
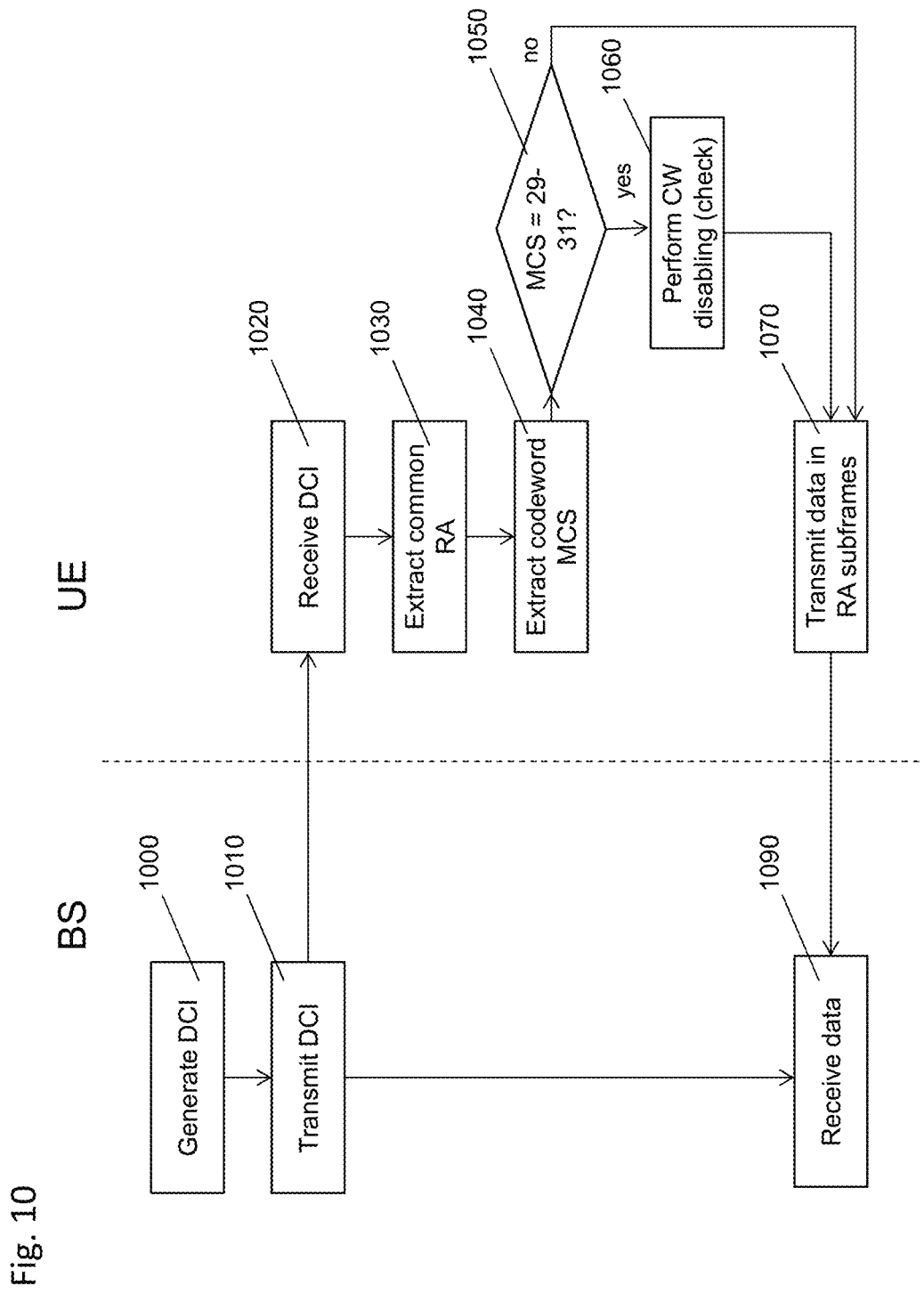
FIG. 10 is a flow diagram illustrating methods according to an embodiment.

FIG. 10 shows an exemplary method according to the present disclosure. In particular, FIG. 10 shows a method for receiving a resource grant for multiple subframes in a communication system. Such method may be performed at an apparatus such as a user equipment (UE) as exemplified in the figure. The method comprises: receiving 1020 signal comprising control information. The control information may be a downlink control information, DCI. For the purpose of the present invention it is immaterial, in which manner the DCI is received. It may be by monitoring (including blind decoding) of PDCCH as in the LTE, but it may also be performed in a scheduled manner or in any other manner.

The DCI comprises the resource grant for multiple subframes and a plurality of codewords for each subframe, and a modulation and coding scheme, MCS, indicator common for the granted multiple subframes and individual for each of the plurality of codewords, the MCS indicator taking one of a plurality of values including values indicating one of a plurality of MCSs and at least one value not indicating MCS. Correspondingly, the method may further include steps of extracting 1030 from the DCI the resource grant (resource allocation, RA) for the multiple subframes and extracting 1040 the MCS indicator for each of the multiple codewords. Then the MCS value is evaluated 1050 for a first codeword. If the MCS belongs to the interval of values which are not assigned to any MCS (also in the legacy single-subframe allocations) (yes in the step 1050), then the CW may be directly set as disabled in step 1060 for the scheduled transmission. However, according to another embodiment, further parameter(s) are checked in the step 1060 in order to decide whether or not the codeword is to be disabled. The same evaluation is performed for a second (or even further) codeword. The checking may include evaluation of the RV value signaled on a per subframe basis, which enables additionally to control enabling/disabling on a per subframe basis. In other words, step 1060 is a step of determining that a codeword from the plurality of codewords in the multiple subframes is disabled if the MCS indicator for at least one of the plurality of codewords has a value not indicating MCS (yes in step 1050) and not disabled otherwise (no in step 1050). In the step 1070, the scheduled data transmission is performed. In particular, the transmission over the multiple subframes is performed in the allocated (granted) resources using the configured MCS for the enabled codewords. The disabled codewords are not transmitted.

The evaluation of the MCS value and the corresponding other parameter(s) may includes steps corresponding to the function of the processing device described for the above apparatus.

For instance, the method may further include extracting from the DCI a precoding indication common for the multiple subframes. The precoding indication may be also common for both codewords for all subframes. In particular, there may be a precoding indication field which indicates TPMI and number of layers for both enabled codewords if both codewords are enabled and the same for one enabled codeword, if only one enabled codeword is enabled. If the codeword may be enabled or disabled on a subframe basis, the method may include extraction of a first precoding indication for subframes with both codewords enabled and a second precoding indication with only one codeword enabled. These indications may be extracted from two separate fields in the DCI, the two fields may have the same length or may differ. The fields may have the format similar to the current precoding information field in the LTE, signaling combination of the TPMI and number of layers. However, the in order to more efficiently convey the control information, only a single precoding information field may be extracted from the DCI, advantageously having a similar format as the precoding information field for legacy (one-subframe scheduling) four antenna ports and both codewords enabled configuration. According to a first range of values in this field, the precoding indication for the one-codeword transmission is determined and according to a second range of values (disjoint with the first range of values) in the field, the precoding information for both codewords enabled is determined. Further alternative ways of determining the precoding indication for the subframes with one or both codewords are mentioned above with reference to the signal structure and the corresponding apparatuses.

FIG. 10 also illustrates the transmission method which may be performed at a scheduling entity such as a network node, base station, access point or another terminal performing scheduling functions. The method may comprise generating 1000 the control information. This includes setting a modulation and coding scheme, MCS, indicator to a value not indicating MCS to indicate that a codeword from the plurality of codewords in the multiple subframes is to be disabled. The control information including such MCS field value and further parameters which may also be set is then transmitted 1010 to the UE within a transmission signal. In particular, the transmitted control information comprises the resource grant for multiple subframes and a plurality of codewords for each subframe, and the MCS indicator common for the granted multiple subframes and individual for each of the plurality of codewords, the MCS indicator taking one of a plurality of values including values indicating one of a plurality of MCSs and at least one value not indicating MCS. As mentioned above, the control information may also include a precoding indication common for the multiple subframes. In step 1090, the data are received (and extracted from the resources) according to the control information.

Figure 11:
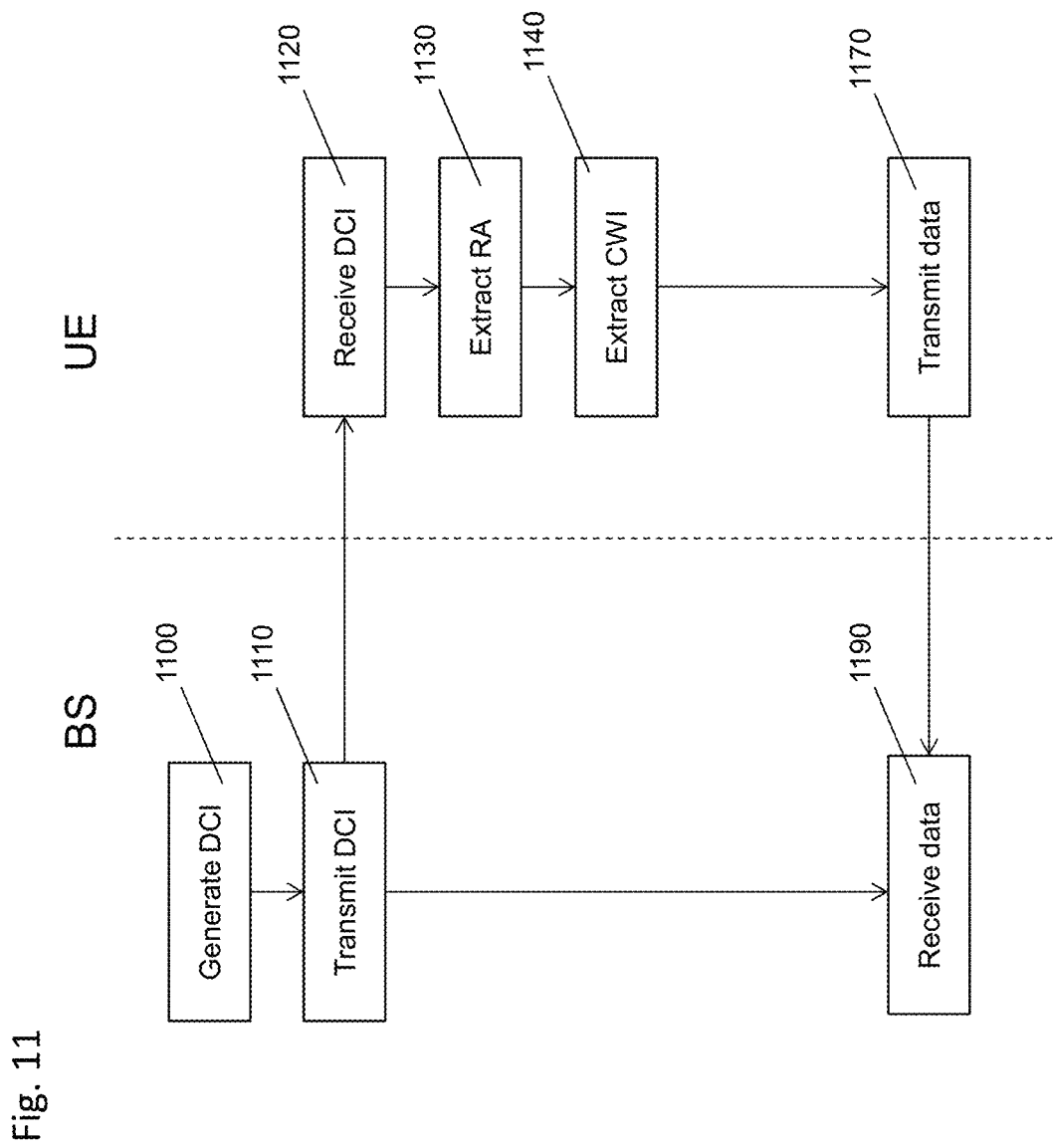
FIG. 11 is a flow diagram illustrating methods according to an embodiment.

FIG. 11 illustrates another embodiment of a method according to present disclosure. The method for receiving a resource grant for multiple subframes in a communication system comprises receiving 1120 signal comprising control information. The control information includes the resource grant common for multiple subframes and a plurality of codewords for each subframe, and a codeword indication indicating enabling or disabling of one or more codewords for each of the multiple subframes. Accordingly, in step 1130 the resource grant is extracted and in step 1140 the codeword indication, CWI, is extracted whereby it is determined for each subframe whether a codeword from the plurality of codewords in said subframes is enabled or disabled according to the codeword indication and/or which codeword is enabled or disabled. The data are then transmitted 1170 with the configuration received in the control information in step 1120, i.e., in the granted resources in the multiple subframes and with the codewords enabled/disabled on a subframe basis according to the extracted CWI.

As is also shown in FIG. 11, a method for transmitting a resource grant for multiple subframes in a communication system comprises selecting for each subframe whether a codeword from the plurality of codewords in said subframes is enabled or disabled and setting a codeword indication accordingly, thereby generating 1100 the control information. The method further comprises a step of transmitting 1110 a signal comprising the control information including the resource grant common for multiple subframes and a plurality of codewords for each subframe, as well as the codeword indication indicating enabling or disabling of one or more codewords for each of the multiple subframes.

In the context of the embodiments and examples presented herein, the description in many cases describes that "one codeword is disabled and one codeword is enabled" and likewise. It should be generally understood that, unless stated otherwise, without loss of generality, an advantageous embodiment of one disabled codeword and one enabled codeword is to enable the first codeword and to disable the second codeword (in the context of, e.g., FIG. 7 the first codeword is Codeword 0, and the second codeword is codeword 1).

The above description provided examples in which the enabling/disabling relates to codewords. It is noted that in the LTE, onto each codeword, a transport block is mapped. The mapping is known to the transmitter and the receiver. In general, the mapping may be predefined or preconfigured, or governed by a predefined rules. On the other hand, the above concepts may also be directly applied to transport block enabling/disabling.

In LTE/LTE-A, in case of only Codeword 0 being enabled, there is still a choice whether Transport Block 1 is mapped to Codeword 0, or whether Transport Block 2 is mapped to Codeword 0, which is particularly relevant in case of disabling a codeword to improve a retransmission of an earlier transmitted transport block. The transport block to codeword mapping is specified in 3GPP TS 36.212, v13.2.0 in Table 5.3.3.1.5-2 which is shown below for the case in which only one codeword (and thus also only one of the two transport blocks) is enabled.

| transport block 1 | transport block 2 | codeword 0 (enabled) | codeword 1 (disabled) |
|---|---|---|---|
| enabled | disabled | transport block 1 | — |
| disabled | enabled | transport block 2 | — |

The embodiments and examples presented herein would in such a case determine which transport block (1 or 2) is enabled and which transport block is disabled (2 or 1), so that the corresponding enabled transport block is mapped to codeword 0. For example, according to the embodiment enabling/disabling the codeword(s) using MCS field values described above, if MCS1 indicator has a value between 29 and 31, the implication is that codeword 0 is enabled and codeword 1 is disabled, and additionally that transport block 1 is disabled and transport block 2 is mapped to codeword 0. On the other hand, if MCS2 indicator has a value between 29 and 31, the implication is that codeword 0 is enabled and codeword 1 is disabled, and additionally that transport block 2 is disabled and transport block 1 is mapped to codeword 0. As is clear to those skilled in the art, this LTE mapping is one option. However, there may be other rules of mapping between the transport blocks and codewords. The present disclosure is applicable with any such rules.

In summary, the present disclosure provides an apparatus for receiving a resource grant for multiple subframes in a communication system, the apparatus comprising a transceiver for receiving signal comprising a control information including the resource grant for multiple subframes and a plurality of codewords for each subframe, a precoding indication common for the multiple subframes, a modulation and coding scheme, MCS, indicator common for the granted multiple subframes and individual for each of the plurality of codewords, the MCS indicator taking one of a plurality of values including values indicating one of a plurality of MCSs and at least one value not indicating MCS, and a processing device configured to determine that a codeword from the plurality of codewords in the multiple subframes is disabled if the MCS indicator for at least one of the plurality of codewords has a value not indicating MCS and not disabled otherwise.

For instance, the plurality of values includes 32 indexed values out of which three with the highest indexes do not indicate MCS and are usable to indicate disabling of a codeword for the multiple subframes.

For example, the control information further comprises a redundancy version indication individual for each of the multiple subframes and common for all codewords in the respective subframe, and the processing device is configured to determine that a codeword from the plurality of codewords in the multiple subframes is disabled if the MCS indicator for at least one of the plurality of codewords has a value not indicating MCS and the redundancy version indication has a first predefined value, and not disabled otherwise.

In particular, advantageously, in a subframe in which one codeword is enabled and one codeword is disabled, the processing device is configured to determine a redundancy version for the enabled codeword based on the particular value not indicating MCS, which is used to indicate disabling of the disabled codeword together with the redundancy version indication.

Moreover, in one example, in a subframe in which two codewords are enabled and no codeword is disabled, the processing device is configured to determine the MCS for the enabled codewords based on the particular value indicating MCS, which is not used to indicate disabling of the disabled codeword together with the redundancy version indication.

Advantageously, the precoding indication is indicating a combination of transmitted precoding matrix indication, TPMI, and number of transmission layers: indicating a combination of TPMI and number of transmission layers out of a plurality of predefined combinations of TPMI and number of transmission layers; or indicating a combination of TPMI and number of transmission layers out of a plurality of combinations of TPMI and number of transmission layers in a candidate set preconfigured by means of a semi-static signaling; or indicating a combination of TPMI and number of transmission layers either out of a plurality of predefined combinations of TPMI and number of transmission layers which are also selectable for a single-layer configuration using a single codeword per subframe or out of a plurality of predefined combinations of TPMI and number of transmission layers which are not selectable for the single-layer configuration, wherein the values of the precoding indication indicating respective combinations of TPMI and number of transmission layers not selectable for the single-layer system are reserved values in a precoding indication of the single-layer configuration.

The present disclosure further provides an apparatus for receiving a resource grant for multiple subframes in a communication system, the apparatus comprising a transceiver for receiving signal comprising a control information including the resource grant common for multiple subframes and a plurality of codewords for each subframe, a codeword indication indicating enabling or disabling of one or more codewords for each of the multiple subframes, a processing device configured to determine for each subframe whether a codeword from the plurality of codewords in said subframes is enabled or disabled according to the codeword indication and/or which codeword is enabled or disabled.

For instance, the codeword indication is a bitmap including an individual bit for each of the multiple subframes, each individual bit indicating either one or two enabled codewords.

Advantageously, the control information further comprises a modulation and coding scheme, MCS, indicator common for the granted multiple subframes and individual for each of the plurality of codewords, the MCS indicator taking one of a plurality of values including values indicating one of a plurality of MCSs and at least one value not indicating MCS, and the processing device is further configured to determine modulation and coding scheme for each enabled codeword according to the MCS indicator taking a value indicating one of the plurality of MCSs.

For example, the processing device is further configured to determine precoding configuration, in case a single codeword is enabled, based on the MCS indicator taking a value not indicating one of the plurality of MCSs, or to determine which codeword is disabled based on the MCS indicator taking a value not indicating one of the plurality of MCSs or based on the redundancy version indicator for the subframe in which a single codeword is enabled.

Correspondingly to the reception apparatuses, transmission apparatuses are provided. In particular, an apparatus is provided for transmitting a resource grant for multiple subframes in a communication system, the apparatus comprising a processing device configured to set a modulation and coding scheme, MCS, indicator to a value not indicating MCS to indicate that a codeword from the plurality of codewords in the multiple subframes is to be disabled, a transceiver for transmitting signal comprising a control information including: the resource grant for multiple subframes and a plurality of codewords for each subframe, a precoding indication common for the multiple subframes, the MCS indicator common for the granted multiple subframes and individual for each of the plurality of codewords, the MCS indicator taking one of a plurality of values including values indicating one of a plurality of MCSs and at least one value not indicating MCS.

Moreover, an apparatus for transmitting a resource grant for multiple subframes in a communication system is provided, the apparatus comprising: a processing device configured to select for each subframe whether a codeword from the plurality of codewords in said subframes is enabled or disabled and to set a codeword indication accordingly; a transceiver for transmitting a signal comprising a control information including the resource grant common for multiple subframes and a plurality of codewords for each subframe, the codeword indication indicating enabling or disabling of one or more codewords for each of the multiple subframes.

The format and content of the transmitted control information is advantageously similar as described above with reference to the receiving apparatuses.

The present disclosure further relates to a method for receiving a resource grant for multiple subframes in a communication system, the method comprising: receiving signal comprising a control information including the resource grant for multiple subframes and a plurality of codewords for each subframe, a precoding indication common for the multiple subframes, a modulation and coding scheme, MCS, indicator common for the granted multiple subframes and individual for each of the plurality of codewords, the MCS indicator taking one of a plurality of values including values indicating one of a plurality of MCSs and at least one value not indicating MCS, and determining that a codeword from the plurality of codewords in the multiple subframes is disabled if the MCS indicator for at least one of the plurality of codewords has a value not indicating MCS and not disabled otherwise.

Moreover, a method is provided for receiving a resource grant for multiple subframes in a communication system, the method comprising: receiving signal comprising a control information including the resource grant common for multiple subframes and a plurality of codewords for each subframe, a codeword indication indicating enabling or disabling of one or more codewords for each of the multiple subframes, determining for each subframe whether a codeword from the plurality of codewords in said subframes is enabled or disabled according to the codeword indication and/or which codeword is enabled or disabled.

Still further, the corresponding transmission methods are provided. In particular, a method is provided for transmitting a resource grant for multiple subframes in a communication system, comprising setting a modulation and coding scheme, MCS, indicator to a value not indicating MCS to indicate that a codeword from the plurality of codewords in the multiple subframes is to be disabled; and transmitting signal comprising a control information including: the resource grant for multiple subframes and a plurality of codewords for each subframe, a precoding indication common for the multiple subframes, the MCS indicator common for the granted multiple subframes and individual for each of the plurality of codewords, the MCS indicator taking one of a plurality of values including values indicating one of a plurality of MCSs and at least one value not indicating MCS.

Moreover, a method for transmitting a resource grant for multiple subframes in a communication system is provided, comprising the steps of selecting for each subframe whether a codeword from the plurality of codewords in said subframes is enabled or disabled and to setting a codeword indication accordingly; a step of transmitting a signal comprising a control information including the resource grant common for multiple subframes and a plurality of codewords for each subframe, the codeword indication indicating enabling or disabling of one or more codewords for each of the multiple subframes.

The format and content of the control information may advantageously be the same as described above with reference to the receiving apparatuses and as exemplified in the above disclosure.

In accordance with another embodiment, a (non-transitory) computer readable medium is provided with a program stored therein, which when running on a computer, executes the steps of the above described method.

Hardware and Software Implementation of the Present Disclosure

Other exemplary embodiments relate to the implementation of the above described various embodiments using hardware, software, or software in cooperation with hardware. In this connection a user terminal (mobile terminal) and an eNodeB (base station) are provided. The user terminal and base station is adapted to perform the methods described herein, including corresponding entities to participate appropriately in the methods, such as receiver, transmitter, processors.

It is further recognized that the various embodiments may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments may also be performed or embodied by a combination of these devices. In particular, each functional block used in the description of each embodiment described above can be realized by an LSI as an integrated circuit. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

In summary, the present disclosure relates to enabling and disabling of codewords in multi-subframe grants. In particular, dynamic and subframe based enabling/disabling of codewords is enabled even if other control parameters including the resource allocation is performed for multiple subframes. For instance, signal from a scheduling entity to a scheduled entity comprises control information including the resource grant common for multiple subframes and a plurality of codewords for each subframe, and a codeword indication indicating enabling or disabling of one or more codewords for each of the multiple subframes. For each subframe it is determined whether a codeword from the plurality of codewords in said subframes is enabled or disabled according to the codeword indication and/or which codeword is enabled or disabled. The indication of enabling and disabling can alternatively be done by using modulation and coding scheme indicator values which are not associated with a particular modulation and coding scheme.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An integrated circuit for controlling an apparatus, the integrated circuit comprising:
    transceiver circuitry, which, in operation, receives a signal comprising control information for scheduling a physical channel, wherein the control information includes:
        a value indicative of a number of multiple subframes, wherein each subframe of the multiple subframes comprises a first transport block (TB) and a second TB,
        a redundancy version (RV) indication, and
        a first modulation and coding scheme (MCS) indicator for the first TB and a second MCS indicator for the second TB, which are common for the multiple subframes; and
    processing circuitry, which is coupled to the transceiver circuitry and which, responsive to the first MCS indicator taking a value of a specific MCS indicator and the RV indication taking a defined value, the specific MCS indicator not used to indicate MCS when the RV indication takes the defined value, determines that all of the first TBs in the multiple subframes are disabled and, responsive to the second MCS indicator taking a value of the specific MCS indicator and the RV indication taking the defined value, determines that all of the second TBs in the multiple subframes are disabled.

2. The integrated circuit according to claim 1, wherein the first MCS indicator and the second MCS indicator are capable of taking one of a plurality of values including values indicating MCSs and at least one value of the specific MCS indicator, wherein the plurality of values include 32 indexed values, out of which the at least one value is assigned to the specific MCS indicator.

3. The integrated circuit according to claim 1, wherein the RV indication is specific to each of the multiple subframes and common for the first TB and the second TB in each subframe.

4. The integrated circuit according to claim 3, wherein in a subframe in which one of the first TB and the second TB is enabled and the other of the first TB and the second TB is disabled, the processing circuitry determines a redundancy version for the enabled TB based on the RV indication and on the value of the specific MCS indicator, which is used to indicate disabling of the disabled TB.

5. The integrated circuit according to claim 3, wherein in a subframe in which the first TB and the second TB are enabled, the processing circuitry determines the MCS for the first and second TBs based on the RV indication and on the value of the MCS indicator indicating MCS.

6. The integrated circuit according to claim 1, wherein the control information includes a precoding indication.

7. The integrated circuit according to claim 6, wherein the precoding indication indicates a combination of a transmitted precoding matrix indication (TPMI) and a number of transmission layers, wherein the combination is selected from:
    a plurality of predefined combinations of a TPMI and a number of transmission layers; or
    a plurality of combinations of a TPMI and a number of transmission layers in a candidate set preconfigured by means of a semi-static signaling; or
    a first plurality of predefined combinations of a TPMI and a number of transmission layers which are selectable for a single-layer configuration using a single TB per subframe, or a second plurality of predefined combinations of a TPMI and a number of transmission layers which are not selectable for the single-layer configuration, wherein values of the precoding indication in the second plurality are reserved values in the first plurality.

* * * * *